United States Patent
Bevly, III

(10) Patent No.: US 9,325,388 B2
(45) Date of Patent: Apr. 26, 2016

(54) WIRELESS TELEMETRY SYSTEM INCLUDING AN INDUCTION POWER SYSTEM

(75) Inventor: Alex J. Bevly, III, Orlando, FL (US)

(73) Assignee: SIEMENS ENERGY, INC., Orlando, FL (US)

( * ) Notice: Subject to any disclaimer, the term of this patent is extended or adjusted under 35 U.S.C. 154(b) by 523 days.

(21) Appl. No.: 13/529,031

(22) Filed: Jun. 21, 2012

(65) Prior Publication Data

US 2013/0342360 A1    Dec. 26, 2013

(51) Int. Cl.
| | |
|---|---|
| H04B 5/00 | (2006.01) |
| H01F 38/14 | (2006.01) |
| H04Q 9/00 | (2006.01) |
| F01D 17/02 | (2006.01) |

(52) U.S. Cl.
CPC .............. *H04B 5/0075* (2013.01); *F01D 17/02* (2013.01); *H01F 38/14* (2013.01); *H04Q 9/00* (2013.01); *F05D 2260/80* (2013.01); *F05D 2270/80* (2013.01); *H04Q 2209/886* (2013.01)

(58) Field of Classification Search
CPC ............ F23R 3/00; F23R 3/007; H01F 38/14; H04B 5/0075; H04Q 2209/886; H04Q 9/00
USPC ........... 340/870.01, 870.03, 870.07; 336/199, 336/200, 205
See application file for complete search history.

(56) References Cited

U.S. PATENT DOCUMENTS

| | | | |
|---|---|---|---|
| 3,440,571 A * | 4/1969 | Simons | ..................... H01P 5/16 333/112 |
| 3,876,998 A | 4/1975 | Richter et al. | |
| 3,890,456 A | 6/1975 | Dils | |
| 4,339,719 A | 7/1982 | Rhines et al. | |
| 4,546,652 A | 10/1985 | Virkar et al. | |
| 4,578,992 A | 4/1986 | Galasko et al. | |
| 4,595,298 A | 6/1986 | Frederick | |
| 4,703,326 A | 10/1987 | Ding et al. | |
| 4,812,050 A | 3/1989 | Epstein | |
| 4,851,300 A | 7/1989 | Przybyszewski | |
| 4,860,442 A | 8/1989 | Ainsworth et al. | |
| 4,916,715 A | 4/1990 | Adiutori | |
| 4,969,956 A | 11/1990 | Kreider et al. | |
| 4,970,670 A | 11/1990 | Twerdochlib | |
| 4,983,034 A | 1/1991 | Spillman, Jr. | |
| 5,005,353 A | 4/1991 | Acton et al. | |
| 5,144,299 A | 9/1992 | Smith | |

(Continued)

FOREIGN PATENT DOCUMENTS

| | | | |
|---|---|---|---|
| JP | 2001176922 | 6/2001 | |
| WO | WO 2008091289 A2 * | 7/2008 | ............... G01D 3/08 |

*Primary Examiner* — Sisay Yacob

(57) ABSTRACT

A telemetry system for use in a combustion turbine engine (10) comprising a sensor (428) in connection with a rotating component such as a turbine blade, and a telemetry transmitter circuit (418) affixed to the turbine blade and in electrical communication with the sensor (428) for routing electronic data signals from the sensor (428) to the telemetry transmitter circuit (418). An induction power system is provided to power the telemetry transmitter circuit (418) and includes a plurality of primary induction coil assemblies (400) each including a primary planar winding (410) formed on a respective ceramic substrates (404), which are mounted end to end on a static seal segment (323) of a stator (180). The induction power system also includes a secondary induction coil assembly (402) comprising a secondary planar winding (412) formed on a ceramic substrate (404), which is mounted to an end face of a turbine blade root (132).

11 Claims, 15 Drawing Sheets

(56) References Cited

U.S. PATENT DOCUMENTS

| | | | |
|---|---|---|---|
| 5,306,368 A | 4/1994 | Yamada et al. | |
| 5,318,725 A | 6/1994 | Sandhage | |
| 5,416,430 A | 5/1995 | Twerdochlib et al. | |
| 5,440,300 A | 8/1995 | Spillman, Jr. | |
| 5,578,877 A | 11/1996 | Tiemann | |
| 5,583,474 A * | 12/1996 | Mizoguchi et al. | 336/83 |
| 5,952,836 A | 9/1999 | Haake | |
| 5,969,260 A | 10/1999 | Belk et al. | |
| 5,970,393 A | 10/1999 | Khorrami et al. | |
| 6,000,977 A | 12/1999 | Haake | |
| 6,034,296 A | 3/2000 | Elvin et al. | |
| 6,072,165 A | 6/2000 | Feldman | |
| 6,109,783 A | 8/2000 | Dobler et al. | |
| 6,127,040 A | 10/2000 | Grobbauer et al. | |
| 6,142,665 A | 11/2000 | Haffner et al. | |
| 6,197,424 B1 | 3/2001 | Morrison et al. | |
| 6,262,550 B1 | 7/2001 | Kliman et al. | |
| 6,280,083 B2 | 8/2001 | Kita et al. | |
| 6,331,823 B1 | 12/2001 | El-Ibiary | |
| 6,343,251 B1 | 1/2002 | Herron et al. | |
| 6,398,503 B1 | 6/2002 | Takahashi et al. | |
| 6,437,681 B1 | 8/2002 | Wang et al. | |
| 6,512,379 B2 | 1/2003 | Harrold et al. | |
| 6,523,383 B2 | 2/2003 | Joki et al. | |
| 6,532,412 B2 | 3/2003 | Adibhatla et al. | |
| 6,556,956 B1 | 4/2003 | Hunt | |
| 6,576,861 B2 | 6/2003 | Sampath et al. | |
| 6,591,182 B1 | 7/2003 | Cece et al. | |
| 6,667,725 B1 | 12/2003 | Simons et al. | |
| 6,677,683 B2 | 1/2004 | Klausing et al. | |
| 6,729,187 B1 | 5/2004 | Gregory | |
| 6,735,549 B2 | 5/2004 | Ridolfo | |
| 6,756,131 B2 | 6/2004 | Oguma et al. | |
| 6,756,908 B2 | 6/2004 | Gass et al. | |
| 6,760,689 B2 | 7/2004 | Follin et al. | |
| 6,796,187 B2 | 9/2004 | Srinivasan et al. | |
| 6,808,813 B2 | 10/2004 | Kimura et al. | |
| 6,816,817 B1 | 11/2004 | Retlich et al. | |
| 6,831,555 B1 | 12/2004 | Miller et al. | |
| 6,838,157 B2 | 1/2005 | Subramanian | |
| 6,979,498 B2 | 12/2005 | Darolia et al. | |
| 6,979,991 B2 | 12/2005 | Burn et al. | |
| 7,004,622 B2 | 2/2006 | Hardwicke et al. | |
| 7,009,310 B2 | 3/2006 | Cheung et al. | |
| 7,368,827 B2 | 5/2008 | Kulkarni et al. | |
| 7,423,518 B2 | 9/2008 | Yamada | |
| 7,443,268 B2 | 10/2008 | Tsai et al. | |
| 7,489,226 B1 * | 2/2009 | Chignola | H01F 27/2804 336/229 |
| 7,572,524 B2 | 8/2009 | Sabol et al. | |
| 7,712,663 B2 | 5/2010 | Sukegawa et al. | |
| 7,868,431 B2 | 1/2011 | Feng et al. | |
| 7,932,800 B2 | 4/2011 | Lim et al. | |
| 8,044,757 B2 | 10/2011 | Bae et al. | |
| 8,150,348 B2 | 4/2012 | Ho | |
| 2002/0083712 A1 | 7/2002 | Tomlinson et al. | |
| 2002/0143477 A1 | 10/2002 | Antoine et al. | |
| 2003/0011458 A1 * | 1/2003 | Nuytkens | H01F 27/24 336/200 |
| 2003/0020480 A1 | 1/2003 | Maylotte et al. | |
| 2003/0049119 A1 | 3/2003 | Johnson | |
| 2004/0114666 A1 | 6/2004 | Hardwicke et al. | |
| 2005/0061058 A1 | 3/2005 | Willsch et al. | |
| 2006/0018361 A1 | 1/2006 | Hardwicke et al. | |
| 2006/0020415 A1 | 1/2006 | Hardwicke et al. | |
| 2008/0164844 A1 * | 7/2008 | Kato | H01F 5/003 320/114 |
| 2008/0186124 A1 * | 8/2008 | Schaffer | H01F 27/2895 336/200 |
| 2009/0121896 A1 * | 5/2009 | Mitchell et al. | 340/870.31 |

* cited by examiner

WIRELESS TELEMETRY SYSTEM INCLUDING AN INDUCTION POWER SYSTEM

FIELD OF THE INVENTION

The present invention relates generally to monitoring operating environments and, in particular, to instrumented components and telemetry systems enabled for wirelessly transmitting electronic data indicative of individual component condition within an operating environment such as that of a combustion turbine engine.

BACKGROUND OF THE INVENTION

Embodiments of the present invention provide high temperature wireless telemetry systems configured for operation on rotating or stationary components within an operating environment having an operating temperature up to approximately 450° C. or greater, such as within certain sections of a combustion turbine engine.

An exemplary high temperature telemetry system for use in a combustion turbine engine may include at least one sensor deposited on a component such as a turbine blade. A telemetry transmitter circuit may be affixed to the turbine blade and a connecting material may be attached or deposited on the turbine blade for routing electronic data signals from the sensor to the telemetry transmitter circuit, the electronic data signals indicative of a condition of the turbine blade. An induction power system is provided for powering the telemetry transmitter circuit with a rotating data antenna affixed to the component, such as the turbine blade; and a stationary data antenna affixed to a static seal segment adjacent to the turbine blade.

In an embodiment of the telemetry system a resonant energy system is used in conjunction with the rotating data antenna and the stationary data antenna. More specifically, a primary coil (which may be in the form of a probe or antenna), or power/energy transmitting device, is positioned at a stationary location in the turbine or compressor proximate to a secondary coil or power/energy receiving device that is affixed to the rotating components. The primary coil or antenna transmits an oscillating current signal and the secondary coil is in resonance at generally the same frequency as a transmitting frequency of the oscillating current signal. The secondary coil and the rotating data antenna are fabricated on a same substrate on which the telemetry transmitter circuit is fabricated. Alternatively, one or both of the secondary coil and/or the rotating data antenna may be disposed on an airfoil portion of a turbine or compressor blade. In an embodiment, the primary coil may be mounted to a casing or stationary component for the compressor or turbine proximate to and in spaced relation to a tip of the blade.

Sensors in connection with a rotating component such as a compressor or turbine blade are electrically linked to the telemetry transmitter circuit which processes and routes electronic data signals indicative of a condition of the rotating component to the rotating data antenna. The rotating data antenna then transmits the electronic data signals to the stationary antenna which then transmits signals to a receiver and/or processor.

In another embodiment, a stationary telemetry transmitter circuit is disposed within the compressor and turbine, and used in conjunction with the above-referenced rotating telemetry transmitter circuit mounted to a blade. One or more sensors in connection with stationary components transmit electronic data signals indicative of the stationary component to the stationary transmitter circuit, which in turn processes and routes the electronic data signals to the stationary data antenna. Accordingly, the stationary data antenna is configured to transmit electronic data signals indicative of operating conditions of the stationary and rotating components to a receiver for processing.

DETAILED DESCRIPTION OF THE INVENTION

Figure 1:
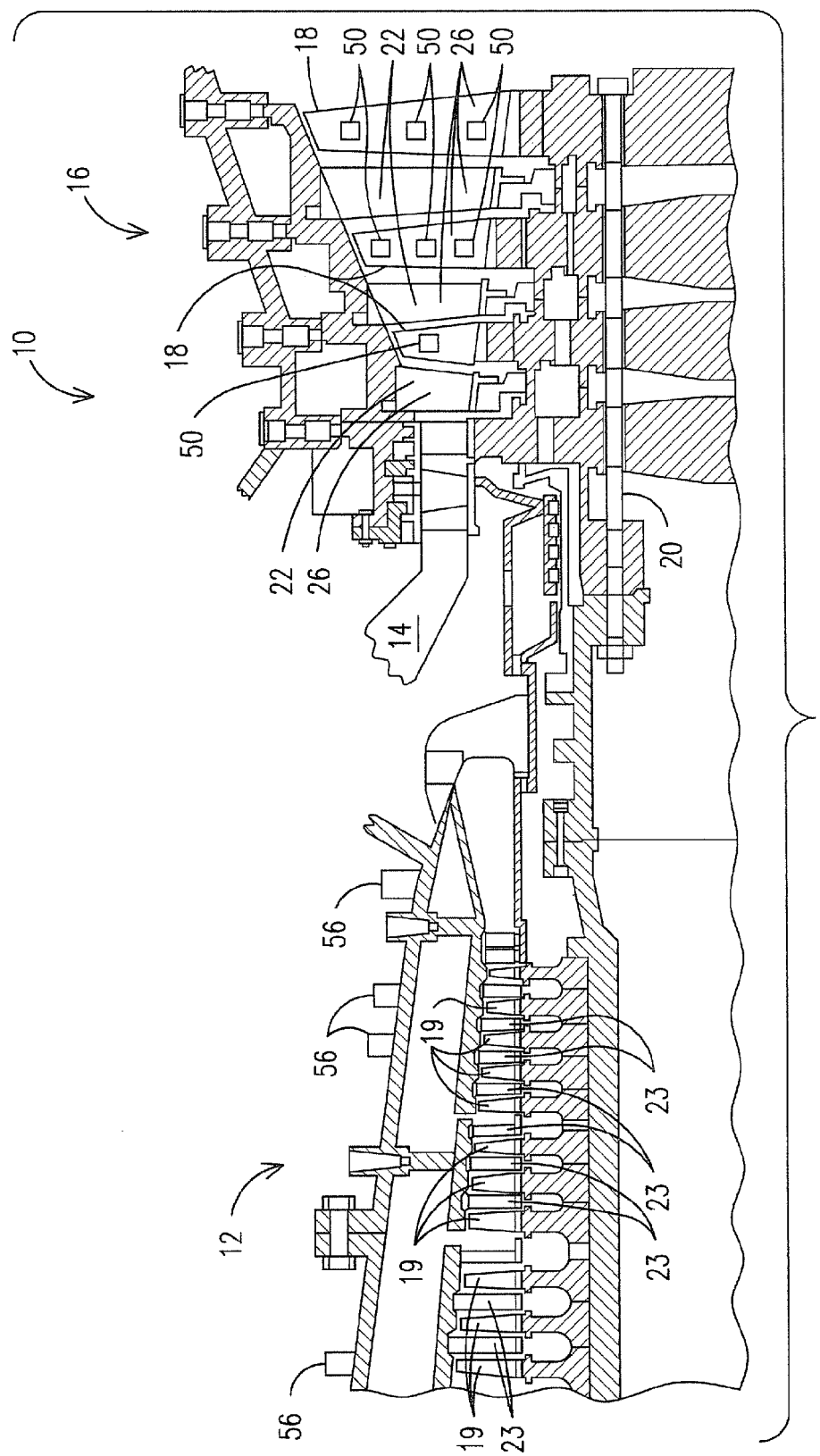
FIG. 1 is a cross sectional view of an exemplary combustion turbine.

FIG. 1 illustrates an exemplary combustion turbine 10 such as a gas turbine used for generating electricity. Embodiments of the invention may be used with combustion turbine 10 or in numerous other operating environments and for various purposes. Combustion turbine 10 includes a compressor 12, at least one combustor 14 (broken away) and a turbine 16. Compressor 12, combustor 14 and turbine 16 are sometimes referred to collectively as a gas or combustion turbine engine 10. Turbine 16 includes a plurality of rotating blades 18, secured to a rotatable central shaft 20. A plurality of stationary vanes 22 are positioned between blades 18, with vanes 22 being dimensioned and configured to guide air over blades 18. Blades 18 and vanes 22 will typically be made from nickel-based alloys, and may be coated with a thermal barrier coating ("TBC") 26, such as yttria-stabilized zirconia. Similarly, compressor 12 includes a plurality of rotating blades 19 positioned between respective vanes 23.

In use, air is drawn in through compressor 12, where it is compressed and driven towards combustor 14. Combustor 14 mixes the air with fuel and ignites it thereby forming a working gas. This working gas temperature will typically be above about 1300° C. This gas expands through turbine 16, being guided across blades 18 by vanes 22. As the gas passes through turbine 16, it rotates blades 18 and shaft 20, thereby transmitting usable mechanical work through shaft 20. Combustion turbine 10 may also include a cooling system (not shown), dimensioned and configured to supply a coolant, for example, steam or compressed air, to blades 18 and vanes 22.

The environment within which turbine blades 18 and vanes 22 operate is particularly harsh, subject to high operating temperatures and a corrosive atmosphere, which may result in serious deterioration of blades 18 and vanes 22. This is especially likely if TBC 26 should spall or otherwise deteriorate. Embodiments of the invention are advantageous because components may transmit real time or near real time data indicative of a component's condition during operation of combustion turbine 10.

U.S. Pat. No. 6,576,861, the disclosure of which is specifically incorporated herein by reference, discloses a method and apparatus that may be used to deposit embodiments of sensors and connectors for connecting sensors with transmitters or otherwise routing data signals. In this respect, methods and apparatus disclosed therein may be used for the patterning of fine sensor and/or connector features of between about 100 microns and 500 microns without the need of using masks. Multilayer electrical circuits and sensors may be formed by depositing features using conductive materials, resistive materials, dielectric materials, insulative materials and other application specific materials. Alternate methods may be used to deposit multilayer electrical circuits, sensors and connectors such as thermal spraying, vapor deposition, laser sintering and curing deposits of material sprayed at lower temperatures may be used as well as other suitable techniques.

Figure 2:
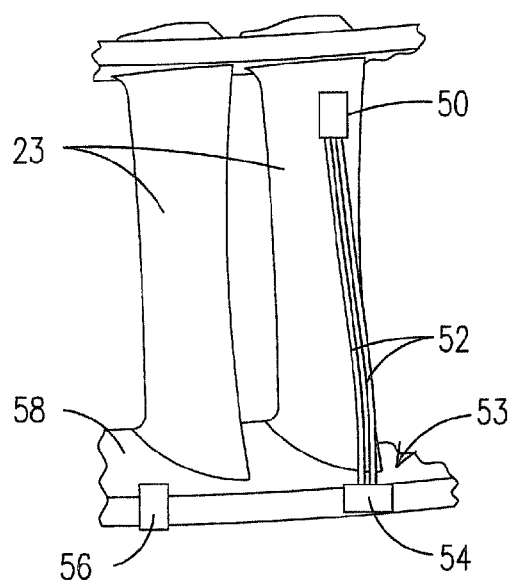
FIG. 2 is a perspective view of an exemplary combustion turbine vane.

FIG. 2 illustrates a pair of adjacent vanes 23 removed from compressor 12 with one vane 23 having a sensor 50 mounted or connected thereto for detecting a condition of the vane. A lead line or connector 52 may be deposited as a means for routing a data signal from sensor 50 to a transmitter 54 configured for wirelessly transmitting the data signal to a transceiver 56. Connector 52 may be one or a plurality of electrical leads for conducting a signal from sensor 50 to transmitter 54. Alternate embodiments allow for various types of connectors 52 to be used as a means for routing a data signal from sensor 50 to transmitter 54, depending on the specific application.

Transmitters 54 may be multi-channel and have various specifications depending on their location within a casing of combustion turbine 10. Transmitters 54 may be configured to function within the early stages of compressor 12, which are subject to operating temperatures of between about 80° C. to 120° C. Transmitters 54 may be configured to function within later stages of compressor 12 and/or stages of turbine 16 subject to operating temperatures of greater than about 120° C. and up to about 300° C. Transmitters 54 may be fabricated using silicon-on-insulator (SOI) technology and other materials capable of operating in regions with temperatures greater than about 120° C.

Figure 3:
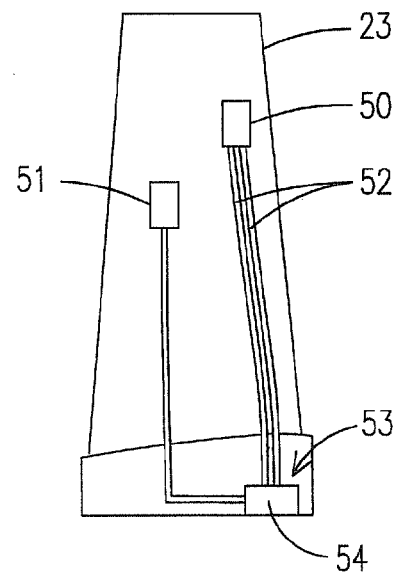
FIG. 3 is a side view of the vane of FIG. 2.

FIG. 3 illustrates a schematic plan view of compressor vane 23 having sensor 50 connected therewith and connector 52 connecting sensor 50 with transmitter 54. A power source 51 may be provided, such as an appropriately sized battery for powering transmitter 54. Transmitter 54 may receive signals from sensor 50 via connector 52 that are subsequently wirelessly transmitted to transceiver 56. Transceiver 56 may be mounted on hub 58 or on a surface external to compressor 12 such as the exemplary locations shown in FIG. 1. Transceiver 56 may be mounted in various locations provided it is within sufficient proximity to transmitter 54 to receive a wireless data transmission, such as an RF signal from transmitter 54.

One or more sensors 50 may be connected with one or more compressor vanes 23 by fabricating or depositing sensors 50 and connectors 52 directly onto a surface of vane 23. Connector 52 may extend from sensor 50 to a termination location, such as the peripheral edge of vane 23 so that a distal end 53 of connector 52 is exposed for connection to transmitter 54. Sensor 50 and connector 52 may be positioned on vane 23 to minimize any adverse affect on the aerodynamics of vane 23. Embodiments allow for a distal end 53 of connectors 52 to be exposed at a termination location, which may be proximate a peripheral edge of a component or other suitable location. This allows a field technician to quickly and easily connect connector 52 to a transmitter 54 regardless of its location.

Figure 4:
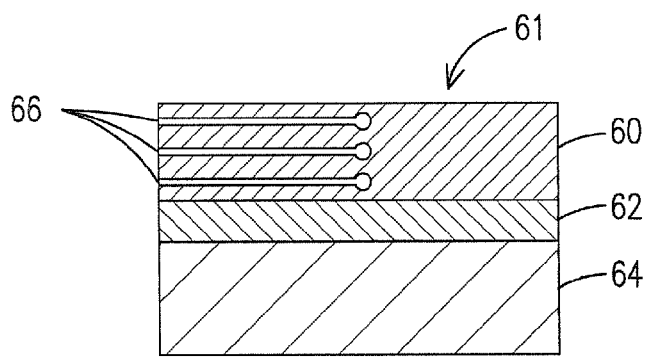
FIG. 4 is an exemplary heat flux sensor deposited on a substrate.

FIG. 4 illustrates an exemplary sensor 61 that may be deposited within a barrier coating such as TBC 60, which may be yttria-stabilized zirconia. TBC 60 may be deposited on a bond coat 62, which may be deposited on a substrate 64. Substrate 64 may be various components such as a superalloy suitable for use in turbine 16 such as a turbine blade 18. Sensor 61 may be formed for various purposes and may include thermocouples 66 deposited using conventional K, N, S, B and R-type thermocouple material, or any combination of their respective constituent elements provided that the combination generates an acceptable thermoelectric voltage for a particular application within combustion turbine 10.

Type K thermocouple materials NiCr or NiAl may be used in sections of compressor 12 having an operating environment up to approximately 800° C. For example, NiCr(20) may be used to deposit a strain gage in compressor 12. Type N thermocouple material, such as alloys of NiCrSi and NiSi, for example, may be used for depositing sensors in sections of turbine 16 having an operating environment between approximately 800° C. to 1150° C.

Type S, B and R thermocouple materials may be used for depositing sensors in sections of turbine 16 having an operating environment between approximately 1150° C. to 1350° C. For example, Pt—Rh, Pt—Rh(10) and Pt—Rh(13) may be deposited to form sensors 50 within turbine 16 provided that the material generates an acceptable thermoelectric voltage for a particular application within combustion turbine 10. Ni alloys, for example, NiCr, NiCrSi, NiSi and other oxidation-resistant Ni-based alloys such as MCrAlX, where M may be Fe, Ni or Co, and X may be Y, Ta, Si, Hf, Ti, and combinations thereof, may be used as sensing materials for high temperature applications in deeper sections of compressor 12 and throughout turbine 16. These alloys may be used as sensing material deposited in various sensing configurations to form sensors such as heat flux sensors, strain sensors and wear sensors.

Figure 5:
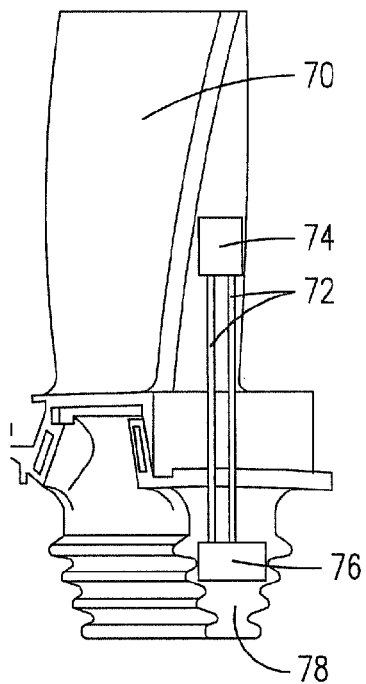
FIG. 5 is a perspective view of an exemplary turbine blade, sensor and wireless telemetry device.

Components within combustion turbine 10, such as blades 18, 19 and/or vanes 22, 23 may have application specific sensors 50 deposited to conform to a component's surface and/or embedded within a barrier or other coating deposited within combustion turbine 10. For example, FIG. 5 shows an exemplary turbine blade 70, which may be a blade from row 1 of turbine 16, having high temperature resistant lead wires, such as connectors 72 deposited to connect an embedded or surface mounted sensor 74 with a wireless telemetry device 76. Device 76 may be mounted in a location where the telemetry components are exposed to relatively lower temperatures, such as proximate the root 78 of blade 70 where the operating temperature is typically about 150° C.-250° C. and higher.

Silicon-based electronic semiconductors, such as those that may be used for transmitting data, may have limited applications due to their operational temperature constraints. Temperature and performance properties of silicon and silicon-on-insulator (SOI) electronic chip technologies may limit their applications to operating environments of less than about 200° C. Aspects of the invention allow for such electronic systems to be deployed for wireless telemetry device 76 within compressor 12, which typically has an operating temperature of about 100° C.-150° C.

Embodiments of wireless telemetry sensor systems may be configured to operate within higher temperature regions present in later stages of compressor 12, and within turbine 16. These regions may have operating temperatures of about 150° C.-250° C. and higher. Materials having temperature and electrical properties capable of operation in these higher temperature regions may be used for depositing sensors 50, 74, connectors 52, 72 and fabricating wireless telemetry devices 76.

Sensors 50, 74 and high temperature interconnect lines or connectors 52, 72 may be deposited using known deposition processes such as plasma spraying, EB PVD, CVD, pulsed laser deposition, mini-plasma, direct-write, mini-HVOF or solution plasma spraying. Typically, dynamic pressure measurements, dynamic and static strain, and dynamic acceleration measurements are desired on both stationary and rotating components of combustion turbine 10 together with component surface temperature and heat flux measurements. Thus, embedded or surface mounted sensors 50, 74 may be configured as strain gages, thermocouples, heat-flux sensors, pressure transducers, micro-accelerometers as well as other desired sensors.

Figure 6:
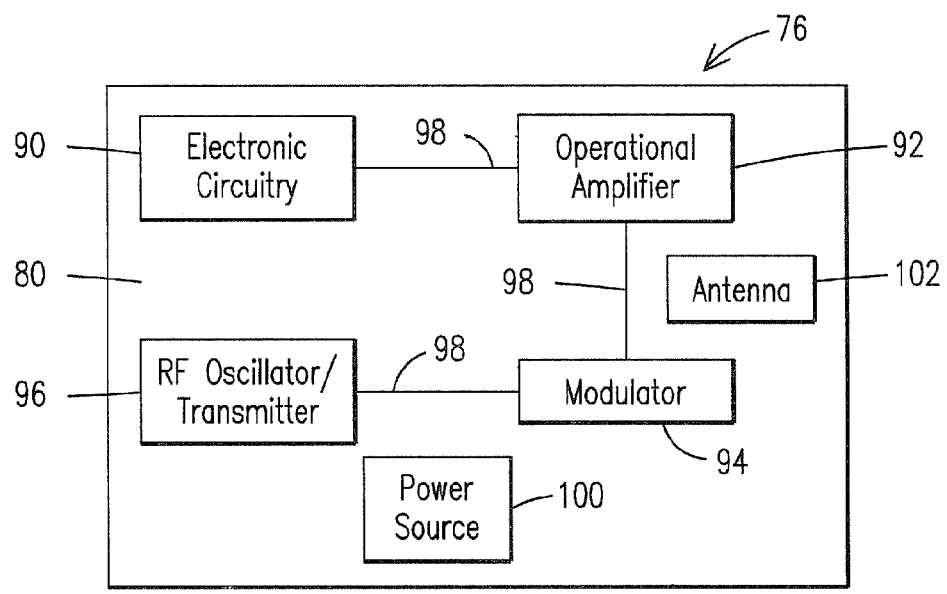
FIG. 6 is a schematic of an exemplary wireless telemetry device.

FIG. 6 is a schematic of a representative embodiment of a wireless telemetry device 76. Device 76 may be formed as a circuit board or integrated chip that includes a plurality of electronic components such as resistors, capacitors, inductors, transistors, transducers, modulators, oscillators, transmitters, amplifiers, and diodes either embossed, surface mounted or otherwise deposited thereon with or without an integral antenna and/or power source. Embodiments of wireless telemetry device 76 may be fabricated for use in compressor 12 and/or turbine 16.

Wireless telemetry device 76 may include a board 80, an electronic circuit 90, an operational amplifier 92, a modulator 94 and an RF oscillator/transmitter 96 electrically connected with each other via interconnects 98. The embodiment of FIG. 6 is an exemplary embodiment and other embodiments of device 76 are contemplated depending on performance specifications and operating environments. Embodiments of device 76 allow for a power source 100, and a transmitting and receiving antenna 102 to be fabricated on board 80 thereby forming a transmitter such as transmitter 54 shown in FIGS. 2 and 3, or wireless telemetry device 76, shown in FIG. 5.

Figure 7:
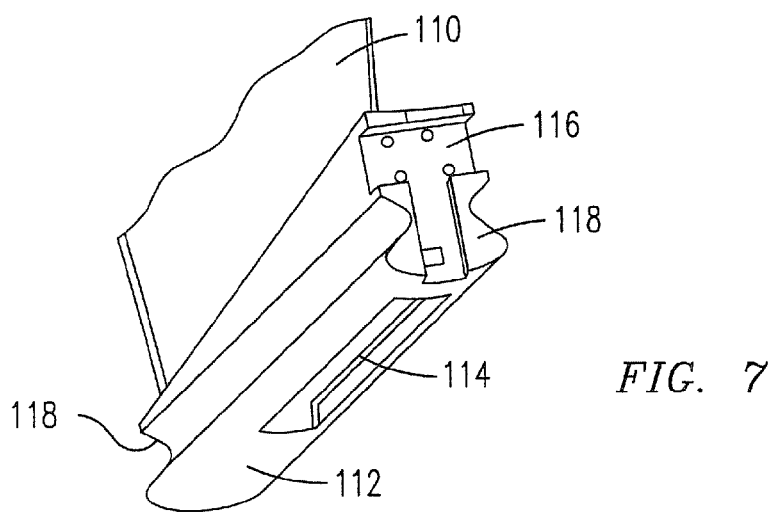
FIG. 7 is a partial perspective view of an exemplary compressor blade.

FIG. 7 illustrates a partial perspective view of an exemplary blade, such as a blade 110 having a blade root 112, which may be a compressor blade within compressor 12. One or more recesses or trenches 114 may be formed within root 112 such as within the bottom of blade root 112. Recesses 114 may be formed in various shapes or dimensions and located within blade root 112 at various places along its length. One or more recesses or trenches 116 may be formed in one or more faces 118 of blade root 112. Recesses 116 may be formed in various shapes or dimensions and located within blade root 112 at various places within a face 118. Recesses 114, 116 may be formed using various methods such as by milling them out after blade 110 is cast or by forming them as part of the blade 110 mold.

Figure 8:
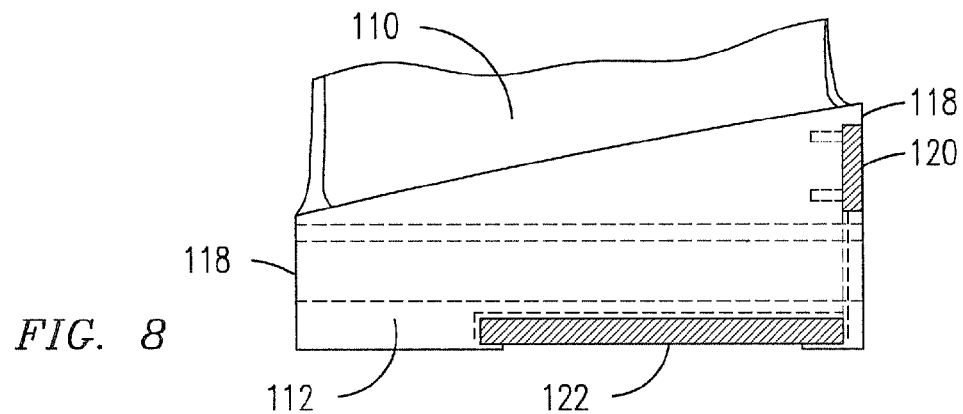
FIG. 8 is a partial side view of the exemplary compressor blade of FIG. 7.

FIG. 8 illustrates compressor blade 110 instrumented with components of wireless telemetry device 76 affixed within blade root 112. In this respect, alternate embodiments of wireless telemetry device 76 allow for one or more electrical components 90, 92, 94, 96, 100, 102, shown in FIG. 6, to be mounted separately or contained on discrete boards 80 that are electrically connected and affixed with an instrumented component such as blade root 112. For example, a transmitting and receiving antenna 102 shown in FIG. 6 may be mounted separately from and electrically connected with board 80 having a transmitter 122 formed thereon and being electrically connected with antenna 102.

Antenna 120 may be seated within recess 116 and transmitter 122 may be seated within recess 114. In this aspect, antenna 120 and transmitter 122 are not mounted/embossed or deposited onto a board 80. In other embodiments, antenna 120 may be deposited on a wireless telemetry board 80, as shown in FIG. 6, and the data may be transmitted using wireless telemetry to a receiver such as a stationary mounted transceiver 56. Power source 100 may be integral with board 80 or located separately from the board and mounted as a discrete component.

Figure 9:
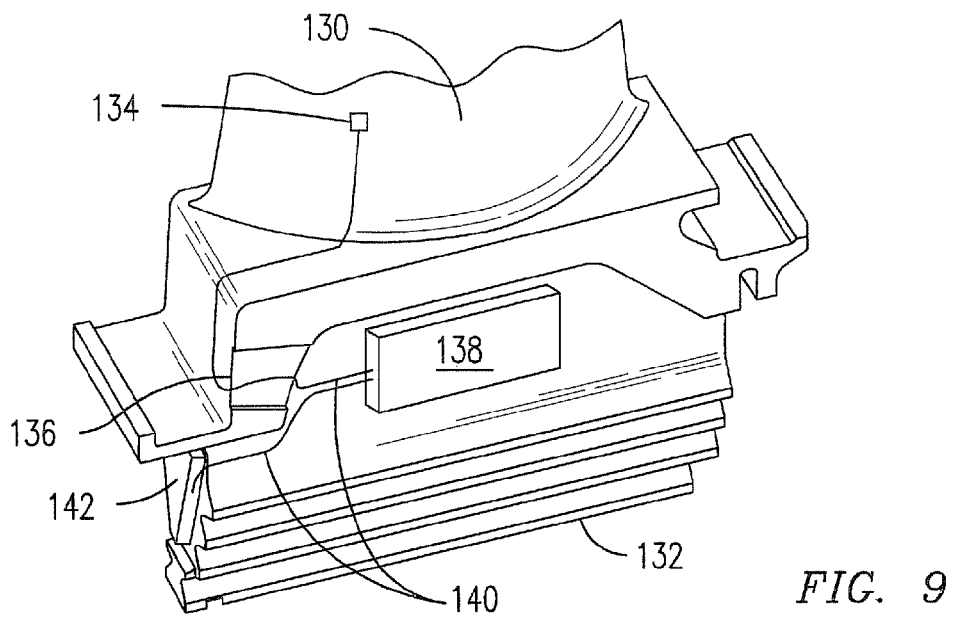
FIG. 9 is a partial cross sectional view of the exemplary turbine blade of FIG. 5.

FIG. 9 illustrates a partial view of an exemplary blade 130, which may be a turbine blade such as one of the turbine blades 18. Turbine blade 130 includes a root portion 132 defining an outer mold line for mating with a rotor disk of turbine 16 within which blade 130 may be secured for operation of combustion turbine 10. Sensing material may be deposited on blade 130 or within a barrier coating deposited on the blade's surface to form a sensor 134. Connecting material may be deposited to form connectors 140 so that data signals from sensor 134 may be communicated to a transmitter 138 and subsequently to a rotating antenna assembly 142. A recess 136 may be formed within a portion of blade 130 so that one or more connectors 140 are seated below an outer surface of blade 130.

Transmitter 138 and antenna assembly 142 may be integrally secured with blade 130 so that the outer mold line defined by root 132 is not altered. For example, transmitter 138 may be affixed to a transition area, or platform, above the fir tree portion of root 132 and antenna assembly 142 may be affixed to a face of root 132. Alternately, recesses may be formed within the platform and face so that all or a portion of transmitter 138 and/or antenna assembly 142 are seated below the surface of the outer mold line of blade root 172. Transmitter 138 and antenna assembly 142 may be secured within respective recesses using an epoxy or adhesive and a backfill material may be placed over them for protection from high temperatures or particulates.

With respect to FIG. 5, wireless telemetry device 76 may be affixed to blade root 78 externally or embedded in such a way so that an outer mold line of the blade root is not significantly altered. Device 76 may be affixed proximate blade root 78 so that it is contained within a cavity that is created between the blade root 78 and a rotor disk of turbine 16 when blade root 78 is inserted within the rotor disk. This enables a turbine blade 70 instrumented with sensor 74, connectors 72 and device 76 to be installed into a mating segment of a rotor disk of turbine 16 in the same manner as a turbine blade that is not instrumented. In this respect, instrumented blade 70 may be manufactured having all components necessary for wirelessly extracting data indicative of various operating parameters or conditions of blade 70 and/or a barrier coating deposited thereon and transmitting that data to a receiving device.

For example, one or more recesses or trenches may be formed into a portion of the substrate of blade 70, such as blade root 78, within which one or more wireless telemetry devices 76 may be contained. Trenches may be formed by milling out desired regions of blade root 78 and securing device 76 within the trench with an epoxy or other suitable binder. The trenches may be back filled with a suitably high temperature cement or ceramic paste to protect device 76.

Embodiments of the present invention allow for transmitting sensor data from a rotating component, such as a turbine engine blade 130 having certain electronic components located on root 132 of the blade, which operates in an environment having a temperature of between about 300° C.-500° C. For purposes of the disclosure herein, the term "high temperature" without additional qualification will refer to any operating environment, such as that within portions of combustion turbine 10, having a maximum operating temperature of between about 300° C.-500° C.

Figure 10:
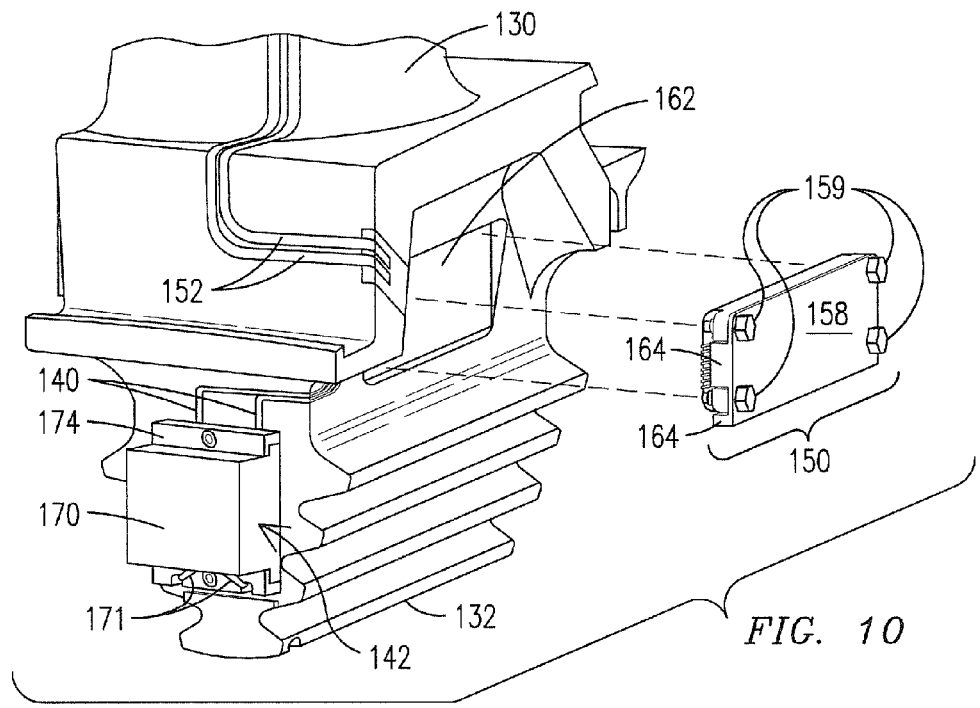
FIG. 10 is a perspective view of the exemplary turbine blade of FIG. 9, an exploded view of a telemetry transmitter housing and an exemplary rotating antenna assembly mounted to the turbine blade.

Embodiments of the present invention provide components for use in combustion turbine 10 instrumented with telemetry systems that may include one or more sensors, lead lines connecting sensors with at least one telemetry transmitter circuit, at least one transmitting antenna, a power source and at least one receiving antenna. FIG. 10 illustrates turbine blade 130, a wireless telemetry transmitter assembly 150 and rotating antenna assembly 142. Lead lines or connectors 152 may extend from one or more sensors, such as sensors 70, 134 to telemetry transmitter assembly 150 when mounted proximate blade root 132. Lead lines 152 may route electronic data signals from sensor 70, 134 to telemetry transmitter assembly 150 where the signals are processed by a telemetry transmitter circuit formed on a circuit board contained within an electronics package 154 shown in FIG. 11. Lead lines or connectors 140 may be deposited for routing electronic data signals from a telemetry transmitter circuit to rotating antenna assembly 142.

Figure 11:
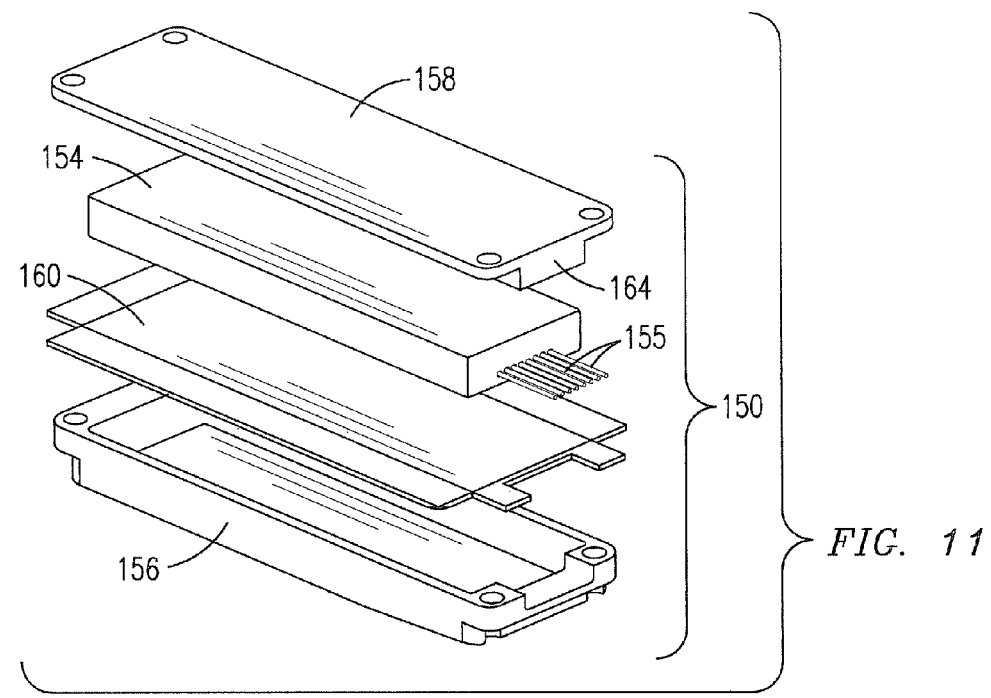
FIG. 11 is an exploded view of an exemplary embodiment of the telemetry transmitter housing of FIG. 10.

FIG. 11 illustrates a high temperature electronics package 154 that may contain a high temperature circuit board and form part of telemetry transmitter assembly 150. The main body of electronics package 154 may be fabricated from alloys such as Kovar, an alloy of Fe—Ni—Co. The thermal expansion coefficient of Kovar ranges from about $4.5\text{-}6.5\times 10^{-6}/°$ C., depending on exact composition. The Ni-based alloys typically used for high temperature turbine components, such as turbine blade 130 have thermal expansion coefficients in the range of about $15.9\text{-}16.4\times 10^{-6}/°$ C. Electronics package 154 may be affixed securely in place while allowing for relative movement between electronics package 154 and turbine blade 130. This relative movement may result from their different thermal expansion rates, which occur over time during the high number of thermal cycles between ambient air temperature and the >450° C. operating temperature typically experienced proximate blade root 132.

The telemetry transmitter assembly 150, as best shown in FIG. 11, may include a mounting bracket 156 and a lid or cover plate 158 with electronics package 154 positioned therebetween. A plurality of connecting pins 155 enable connection between an electronic circuit board contained within package 154, such as one having a wireless telemetry circuit fabricated thereon, and various external devices such as lead lines from sensors, induction coil assemblies and/or data transmission antennae. Mounting bracket 156, cover plate 158 and retention screws 159 connecting them together may all be fabricated from the same material as is turbine blade 130. This ensures there is no difference in thermal expansion between turbine blade 130 and mounting bracket 156. Consequently, no stresses are generated in mounting bracket 156 and/or turbine blade 130 during thermal transients.

The thermal expansion coefficient of electronics package 154 may be less than that of mounting bracket 156 when the operating system within which these components reside is at a high temperature. Consequently, electronics package 154, including any circuit board contained therein, would expand less than mounting bracket 156, which may lead to damage caused by vibrational energy in the system. In order to secure electronics package 154 within mounting bracket 156 to accommodate the dimensional change differential between bracket 156 and electronics package 154, a layer of ceramic fiber woven fabric 160 may be placed between the electronic package 154 and the inside surface of mounting bracket 156. Fabric 160 may be fabricated from suitable ceramic fiber, including such fibers as silicon carbide, silicon nitride or aluminum oxide. For example, a quantity of Nextel™ aluminum oxide based fabric, manufactured by 3M, may be used for fabric 160.

With electronics package 154 and ceramic fiber woven fabric 160 assembled with mounting bracket 156 and cover plate 158 to form telemetry transmitter assembly 150, mounting bracket 156 may be attached to turbine blade 130 by a suitable means for attaching such as bolting, welding, brazing or via transient liquid phase bonding. FIG. 10 illustrates a recess or flat pocket 162 that may be milled or otherwise formed within turbine blade 130 proximate blade root 132 for receiving assembly 150.

Cover plate 158 may be formed with a flange 164 oriented perpendicular to the direction of G-forces, to add structural support to the cover plate, which counters the G-load forces occurring when rotating turbine blade 130 is operating at full speed. This relieves retention screws 159 from carry the load applied to cover plate 158 via G-forces, and allows them to be made sufficiently small so that the telemetry transmitter assembly 150 fits in the relatively small recess 162 with no interference with any adjacent components. If retention screws 159 were required to carry the load applied by the G-forces, their required size would be too large to fit in the available space.

FIG. 10 shows that rotating antenna assembly 142 may be affixed to the end face or neck of root 132. Assembly 142 may be an electronic assembly having thermal expansion coefficients different than those of the Ni-based alloys used for turbine hot gas path components such as turbine blade 130 including its root 132. One or more rotating antenna assemblies 142 may be protected from windage during rotation of turbine blade 130 at near the speed of sound. In an embodiment, the windage protection material is transparent to RF radiation frequencies in order to enable transmission of power and data through the material.

Figure 12:
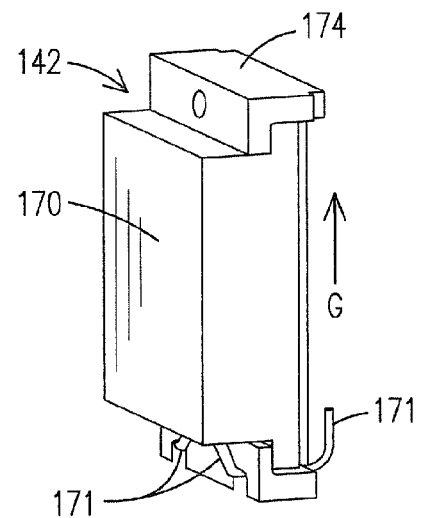
FIG. 12 illustrates components of an exemplary rotating antenna assembly.

Embodiments of rotatable antenna assembly 142 may include a durable, protective, RF transparent cover 170 shown in FIGS. 10 and 12, which is essentially a hollow fixture within which a data antenna and induction power components are contained. RF transparent cover 170 protects its contents from windage and hot gas ingress during operation of combustion turbine 10. Certain ceramics are suitable for protecting RF transmission equipment from the elements at elevated temperatures. However, many ceramics and ceramic matrix composites are prone to chipping and cracking under the vibrational, impact and G-loading that a rotating turbine blade 130 experiences during operation of combustion turbine 10.

The inventors of the present invention have determined that RF transparent cover 170 may be fabricated from an RF transparent, high toughness, structural ceramic materials. Ceramic matrix composites may be used to fabricate housing 170 as well as material selected from a family of materials known as toughened ceramics. Materials such as silicon carbide, silicon nitride, zirconia and alumina are available with increased toughness due to doping with additional elements and/or designed microstructures resulting from specific processing approaches.

One such material that is RF transparent, easy to form, and relatively inexpensive is a material selected from a ceramic family generally referred to as zirconia-toughened alumina (ZTA). Ceramic material selected from this family of aluminum oxide materials is considerably higher in strength and toughness than conventional pure aluminum oxide materials. This results from the stress-induced transformation toughening achieved by incorporating fine zirconium oxide particles uniformly throughout the aluminum oxide. Typical zirconium oxide content is between 10% and 20%. As a result, ZTA offers increased component life and performance relative to conventional pure aluminum oxide materials.

The designed microstructure of ZTA is fracture-resistant when the ceramic is loaded in compression. However, if loaded sufficiently in tension, the ceramic will fail catastrophically, as with traditional ceramic materials. Consequently, RF transparent cover 170 is designed so that the tensile stresses in the ceramic material are minimized during operation of combustion turbine 10. This is accomplished by designing and fabricating such that (1) all corners, edges and bends of the ZTA components are machined to eliminate sharp corners and edges, in order to reduce the stress concentration factor at these locations, and (2) the orientation and fit of the ZTA component in a rotating antennae mounting bracket 174 is such that during operation the G-forces applied to the ZTA box do not generate significant bending stresses in the attachment flanges. This is accomplished by orienting the flanges parallel with the G-loading direction, rather than perpendicular to the G-loading direction, so the ZTA flange is loaded in compression and not in bending.

FIG. 12 illustrates that a rotating antennae mounting bracket 174 may be assembled with RF transparent cover 170 to form rotating antenna assembly 142, as shown affixed to turbine blade 130 in FIG. 10. The interface loading between the rotating antennae mounting bracket 174 and the RF transparent cover 170 minimizes the tensile stresses that occur in RF transparent cover 170. The design is such that the tensile stresses that occur in the RF transparent cover 170 are less than the minimum stress for fracture, resulting in long life for the structural component. Mounting bracket 174 may be made of the same metal as turbine blade 130 because the uniform thermal expansion coefficient between them will result in minimal stresses being generated in the attachment region during heat-up and cool-down cycles.

Mounting bracket 174 may be designed so that all the G-loading experienced by rotating antenna assembly 142 during operation of combustion turbine 10 is absorbed in a direction extending toward upper end 178 of bracket 174, as indicated by arrow G in FIG. 12. No portion of mounting bracket 174 extends far enough past an antenna contained therein to attenuate the RF transmission data signal. RF transparent cover 170 is secured in place so its internal stress field is primarily compressive and may be retained using threaded pins (not shown) through semicircular divots on its flanges.

Mounting bracket 174 may be attached to a face of turbine blade root 132 via conventional means such as welding, brazing, bonding, bolting or screwing. An embodiment of rotating antenna assembly 142 may be assembled by placing desired antennae into the hollow body of RF transparent cover 170, feeding lead wires 171 from the antenna out through holes formed within cover 170 and then filling the hollow body of cover 170 containing the antennae with a ceramic potting material. The potted RF transparent cover 170 containing the antennae may then be slid into mounting bracket 174, which may have been previously affixed to turbine blade root 132. Cover 170 may be secured to mounting bracket 174 via pins inserted in holes in mounting bracket 174 and divots in cover 170.

Embodiments of the present invention may be powered by various means such as induced RF energy and/or by harvesting thermal or vibrational power within the combustion turbine engine 16. In the energy harvested power model, either thermoelectric or vibro-electric power could be generated from the energy available in an operating combustion turbine engine 16. Thermopiles may be used to generate electricity from thermal energy, or piezoelectric materials may generate electricity from vibration of combustion turbine engine 16. Examples of these forms of power sources are described in the patent application having application Ser. No. 11/516,338 filed Sep. 6, 2006, the entire disclosure of which is incorporated herein by reference.

Figure 13:
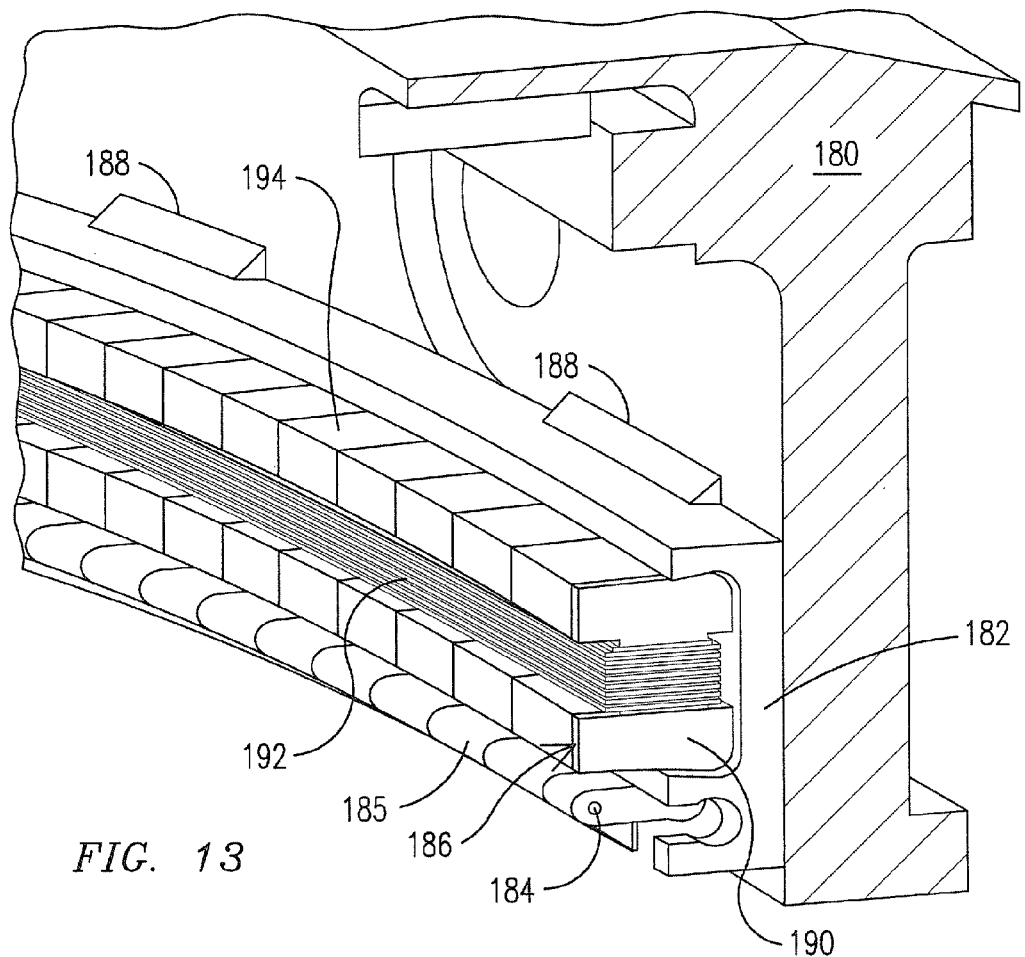
FIG. 13 is a partial perspective view on a turbine static seal having an exemplary embodiment of a stationary antenna assembly mounted thereto.

Embodiments of the present invention provide induced power modes for powering components of wireless high temperature telemetry systems. Such systems may be configured as air-gap transformers where the transformer primary induction coil assembly 186 is stationary and the secondary induction coil assembly 195 rotates. For example, an induced RF power configuration is provided for powering a rotating telemetry transmitter contained within telemetry transmitter assembly 150. FIG. 13 illustrates a portion of a static seal segment 180 such as one that may be used within the turbine engine 16 of combustion turbine 10. A plurality of static seal segments 180 may encircle turbine engine 16 adjacent to a plurality of turbine blades 130. Static seal segments 180 may cooperate with turbine blades 130 for sealing hot gas within a hot gas path through turbine engine 16 as recognized by those skilled in the art.

FIG. 13 shows an arcuate bracket 182 having respective channels or grooves formed therein within which a stationary data transmission antenna 184 and a stationary primary induction coil assembly 186 may be secured. Data transmission antenna 184 may be inserted into a non-conducting holder 185 for securing data transmission antenna 184 with bracket 182. Non-conducting holder 185 ensures that data transmission antenna 184 does not contact bracket 182, which may be fabricated of metal, thereby ensuring correct operation. Non-conducting holder 185 may be fabricated from the same ZTA toughened ceramic material used for the RF transparent cover 170. In the case of employing the antenna 184 in an arcuate bracket 182, such as shown in FIG. 13, holder 185 may be segmented to provide flexibility, which allows for installation in curved bracket 182. The same segmented configuration may be applied to the induction coil assembly 186 to enable installation in a curved bracket 182.

Primary induction coil assembly 186 and data transmission antenna holder 185 may be formed with lobes in the region of attachment to bracket 182. The associated regions of material in the bracket 182 are removed in the same lobe shape, with slightly larger size to accommodate installation. The lobe shape defines a radius of curvature that enables positive retention of induction coil assembly 186 and antenna and holder 184, 185, which may be placed into bracket 182 from an end and slid into position. The lobe shape enables positive retention to be maintained while simultaneously ensuring that tensile stresses are not generated in induction coil assembly 186 and antenna holder 185, both of which may be fabricated of relatively brittle materials subject to structural failure under tensile stresses.

The lobes may be positioned far enough from the front of induction coil assembly 186 and data transmission antenna 184 to ensure that metal bracket 182 does not interfere with functionality. Ceramic cement may be applied between the surfaces of induction coil assembly 186 and antenna holder 185, and their respective pockets in bracket 182, in order to provide a secure fit and accommodate thermal expansion differences during heat up and cool down. A thin plate (not shown) may be attached on each end of bracket 182 that covers the lobed regions of the induction coil assembly 186 and the data antenna 184, ensuring retention during operation.

One or more brackets 182 may be fabricated of the same alloy as static seal segment 180, such as Inconel 625, and have an arcuate shape to conform to the interior surface of static seal segment 180. Bracket 182 may be affixed to the interior surface of static seal segment 180 using an interrupted weld 188 to minimize distortion of static seal segment 180. Induction coil assembly 186 may include at least one stationary core 190 and at least one stationary primary winding 192 with 'H Cement' 194 sold by JP Technologies encasing portions of stationary core 190.

Figure 14:
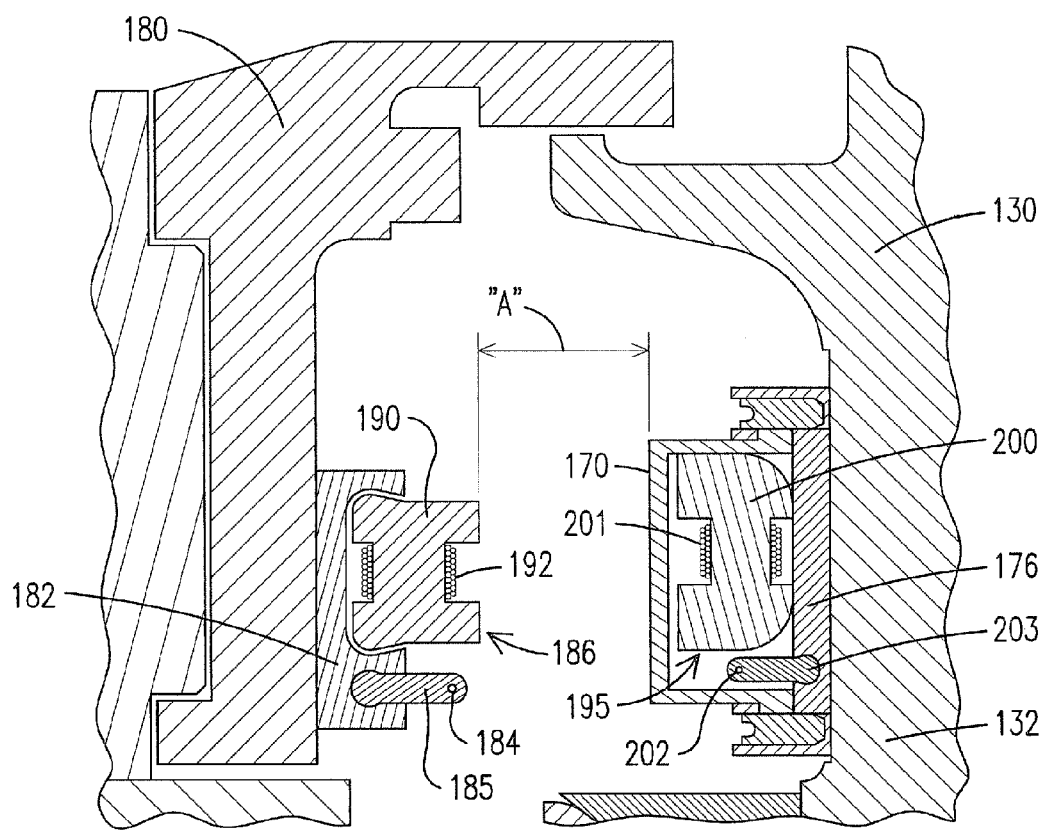
FIG. 14 is a partial cross sectional view of the turbine static seal of FIG. 12 and a turbine blade assembly having an exemplary rotating power and antenna assembly mounted thereto.

FIG. 14 illustrates an embodiment having a rotating secondary induction coil assembly 195 contained within RF transparent cover 170, which may be mounted proximate turbine engine blade root 132. The rotating induction coil assembly 195 may be fabricated from a core 200 and winding 201, similar to the stationary induction coil assembly 186. A rotating data transmission antenna 202 may be provided for communication with stationary data transmission antenna 184. Data transmission antenna 202 may be encased within a non-conducting holder 203, which may be similar in construction as non-conducting holder 185. In an alternate embodiment, data transmission antenna 202 may be contained in RF transparent cover 170, without use of non-conducting holder 203, in which case it may be held in place with a high temperature capable potting material. Single or multiple stationary primary induction coils 186 may be arranged on the interior surface of one or more static seal segments 180 to form an arc that is circumscribed by rotating secondary induction coil assembly 195 and antenna 202 when combustion turbine 10 is in operation.

One or more stationary primary winding 192 may be energized by high frequency, high current power sources. The power can be supplied to each stationary induction coil assembly 186 individually, or a series of stationary induction coil assemblies 186 may be electrically connected and driven by a single power supply. In an exemplary embodiment there may be five adjacent, stationary induction coil assemblies 186 with each driven by its own power supply. The current flowing through each stationary primary winding 192 creates a magnetic field in the rotating secondary induction coil assembly 195 that in turn creates a current in the rotating secondary winding 201. The current from rotating secondary winding 201 supplies power to a wireless telemetry transmitter circuit contained within wireless telemetry transmitter assembly 150 as described more fully herein below.

FIG. 14 illustrates that an initial gap "A" may exist between RF transparent cover 170 and stationary core 190 prior to startup of combustion turbine 10. Initial gap "A" may be about 13 mm at startup of combustion turbine 10 and reduce to about 4 mm at baseload when turbine blade 130 and static seal segment 180 are closer together. Magnetic core materials may be used to fabricate stationary core 190 and rotating core 200. A magnetic material may be used as a core material in order to couple the required power to a telemetry transmitter circuit contained within telemetry transmitter assembly 150 over the required gap "A". The selected magnetic material acts to focus the magnetic field produced by the stationary primary windings 192 and received by one or more rotating secondary windings 201. This effect increases the coupling efficiency between the stationary and rotating elements.

Embodiments of induced power systems disclosed herein may employ multiple individual primary and secondary induction coil assemblies 186, 195 to accommodate various geometries with combustion turbine 10. For instance, stationary induction coil assembly 186 and data transmission primary antenna 184 may need to span a certain distance of static seal segment 180 in order to induce enough power to the system components and transmit the required data. An embodiment of induction coil assembly 186 and data transmission antenna 184 may need to be approximately four feet in length. In this example, for ease of fabrication, four individual power/antenna assemblies each with a length of approximately one foot may be fabricated with respective brackets 182 and installed adjacent to one another on one or more static seal segments 180. If the end-to-end gap distance between the individual antennae is sufficiently small, then the antenna assembly will function as if it were a single, four-foot long antenna. Such antenna assemblies may be formed from straight or curved elements thereby providing assemblies of varying lengths that are straight, curved or otherwise configured as required by the specific application. In an embodiment, a plurality of such antenna assemblies may span an arc of approximately 112 degrees in the top half of one or more static seal segments 180 within turbine 16.

The inventors of the present invention have determined that a particular class of magnetic core materials meets or exceeds the performance requirements of embodiments of the present invention. The general term for this class of materials is a nanocrystalline iron alloy. One composition of this class of material is sold under the trade name NAMGLASS® and has a composition of approximately 82% iron—with the balance being silicon, niobium, boron, copper, carbon, nickel and molybdenum. It has been determined that such nanocrystalline iron alloy material exhibits desirable characteristics such as a Curie temperature greater than 500° C., very low coercivity, low eddy-current loss, high saturation flux density and the permeability is very stable over the entire high temperature operating range.

This nanocrystalline iron alloy material is commercially available in tape-wound configurations in the form of toroids, or "C" core transformer cores. Embodiments of the present invention utilize this nanocrystalline iron alloy material to form an "I" core shape, which was used for the primary stationary core 190. The "I" shape was selected because this shape holds itself in place in the channel on stationary mounting bracket 182. The induction core 190 of each induction coil assembly 186 consists of a plurality of 0.007" thick laminations of nanocrystalline iron alloy material built up into an arc of approximately eleven inches in length. The same nanocrystalline iron alloy material may be used for the rotating antenna 200 transformer core.

Figure 16:
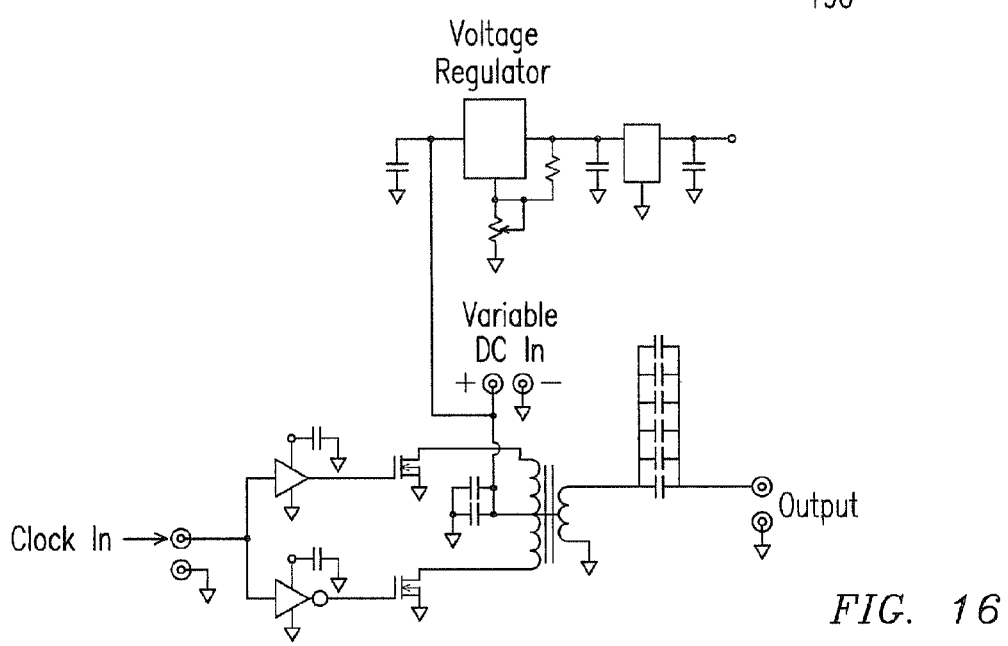
FIG. 16 is a schematic of an exemplary induction power driver circuit.

The strength of the magnetic field used to couple power between the stationary and rotating elements may be increased by increasing the frequency of the driving signal, i.e. the high frequency AC signal produced by an exemplary induction power driver circuit illustrated in FIG. 16. Thus, embodiments of the present invention may employ a high frequency to drive the stationary primary windings 192, such as frequencies greater than approximately 200 kHz. Alternate embodiments may achieve an operating frequency of at least one Mega-Hertz with a power driver designed to operate at such frequencies.

The wire used for winding cores 190, 200 may be made of a 27% nickel-clad copper with ceramic insulation in order to reduce oxidation and failure at high temperatures. The handling characteristics of this wire are significantly more challenging than standard organic-insulated bare copper, as a result of the protective, ceramic coating, and special techniques were developed for the processes of winding both the primary and rotating elements. Other wires may be insulated silver or anodized aluminum.

Two types of ceramic materials may be used in the construction of both the primary and rotating induction coil assemblies 186, 195. It is important to ensure the windings 192, 201 do not short (conduct) to the core elements 190, 200. In addition to ceramic insulation supplied on the wires, a compound, such as H cement, a ceramic cement with ultra fine particle size, may be used as an insulating base coat on the winding cores 190, 200. Once the winding cores 190, 200 are wound they may be potted with Cotronics 940, an aluminum oxide based ceramic cement.

Figure 15:
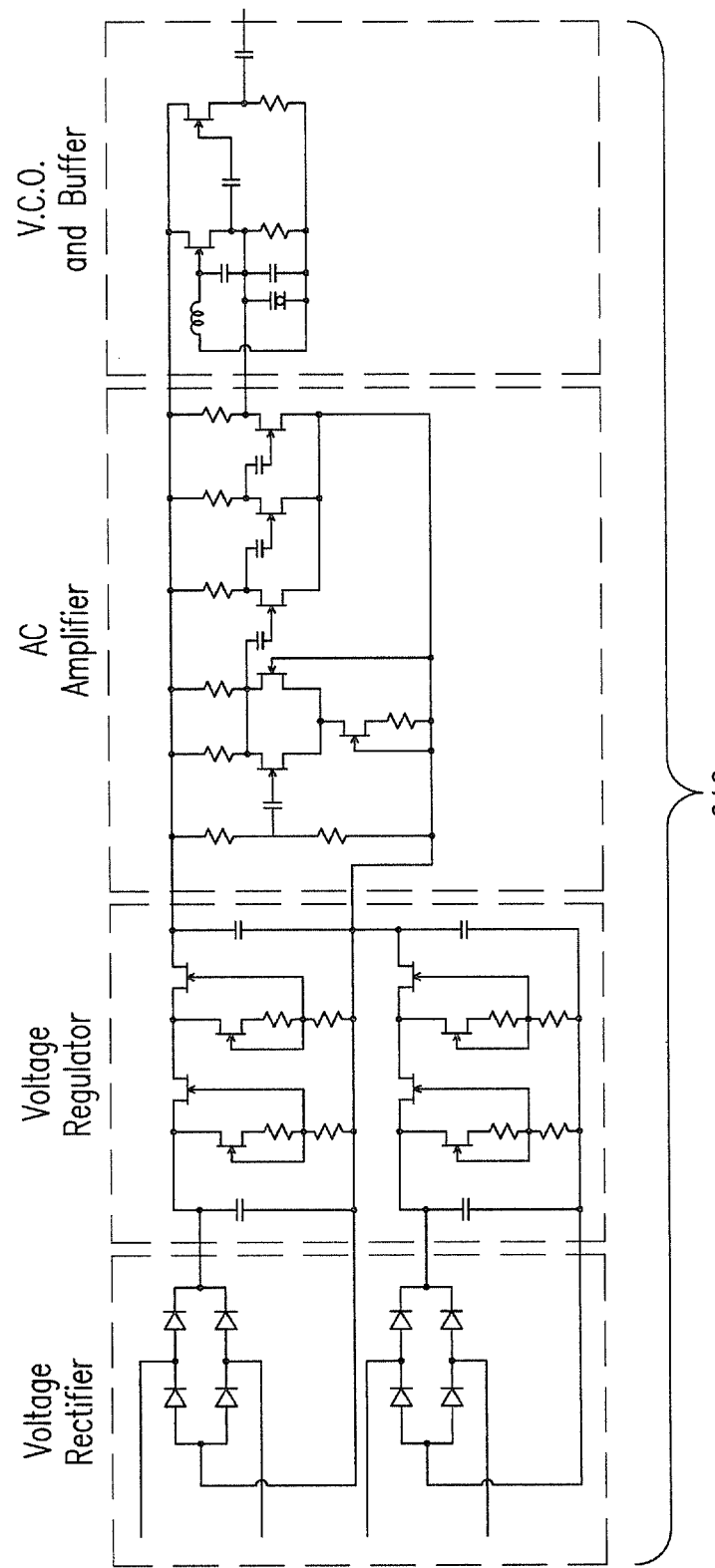
FIG. 15 is a block diagram of an exemplary telemetry transmitter circuit.

FIG. 15 illustrates a schematic of an exemplary telemetry transmitter circuit 210 that may be fabricated on a circuit board fitted inside high temperature electronics package 154 shown in FIG. 11, which is contained within telemetry transmitter assembly 150 shown in FIG. 10. Telemetry transmitter circuit 210 may be configured for operation with a sensor such as sensor 134 of FIG. 9, which may be a strain gauge sensor for measuring strain associated with turbine blade 130.

The rotating secondary induction coil assembly 195 may provide approximately 250 kHz AC power to the voltage rectifier of transmitter circuit 210. This circuit changes the AC input to a DC output and feeds the voltage regulator circuit.

The voltage regulator of transmitter circuit 210 maintains a constant DC voltage output, even though the AC input voltage may vary. A constant voltage output is required to achieve better accuracy and stable operating frequency for the signal output. The voltage regulator also supplies a constant voltage a strain gauge sensor 134 and a ballast resistor (not shown). The strain gauge sensor 134 and ballast resistor provide the sensor signal input to the transmitter circuit 210. As the surface where the strain gauge sensor 134 is mounted deflects, the strain gauge changes resistance, which causes the voltage at the transmitter circuit 210 input to change.

The varying voltage provided by the signal from the strain gauge sensor 134 is amplified first by a differential amplifier and then by a high gain AC amplifier. The resulting signal is applied to a varactor diode in the voltage controlled oscillator (VCO) section of transmitter circuit 210. The VCO oscillates at a high carrier frequency. This carrier frequency may be set in the band of 125 to 155 MHz with respect to transmitter circuit 210. The fixed carrier frequency is changed slightly by the changing voltage on the varactor. This change in frequency or deviation is directly related to the deflection or strain undergone by strain gauge sensor 134. The VCO carrier output is fed to a buffer stage and the buffer output connects to a transmitting antenna contained in the rotating antenna assembly 142 via lead wires 140 of FIG. 10.

In a receiving device, such as transceiver 56 in FIG. 1 or other devices located in high temperature or other areas within combustion turbine 10, the carrier signal is removed and the deviation becomes the amplified output that is proportional to strain. The transistors used in such a transmitter circuit 210 designed for high temperature use may be fabricated from a high temperature capable material, such as wide band gap semiconductor materials including SiC, AlN, GaN, AlGaN, GaAs, GaP, InP, AlGaAs, AlGaP, AlInGaP, and GaAsAlN, or other high temperature capable transistor material may be used up to about 500-600° C.

Various embodiments of wireless telemetry transmitter circuit 210 fabricated on a circuit board may be adapted for use within combustion turbine 10 at varying operating temperatures and with a range of sensor types. Elements of transmitter circuit 210 and alternate embodiments thereof may be fabricated using various temperature sensitive materials such as silicon-on-insulator (SOI) integrated circuits up to approximately 350° C.; polysilseqioxane, PFA, polyimide, Nomex, PBZT, PBO, PBI, and Voltex wound capacitors from approximately 300-350° C.; and PLZT, NPO, $Ta_2O_5$, $BaTiO_3$ multilayer ceramic capacitors from approximately 450-500° C.

Various embodiments of resistors may be fabricated of Ta, TaN, Ti, $SnO_2$, Ni—Cr, Cr—Si and Pd—Ag for operating environments of approximately up to 350° C. and Ru, $RuO_2$, Ru—Ag and $Si_3N_4$ for operating environments of approximately 350° C. and greater. Individual high temperature electronic components, such as discrete transistor, diode or capacitor die made from SiC, AlN, GaN, AlGaN, GaAs, GaP, InP, AlGaAs, AlGaP, AlInGaP, and GaAsAlN, or other high temperature capable semiconducting material, may be replaced by a single SOI CMOS device for operation at temperatures not exceeding approximately 350° C.

With respect to the embodiment of the wireless telemetry device 76 shown in FIG. 6. The antenna 102, which may be a transceiver to receive and/or transmit electrical signals, is fabricated on the same board as a telemetry transmitter circuit. The telemetry transmitter circuit may include the electronic circuit 90, a multivibrator circuit (not shown), an operational amplifier 92, an RF modulator 94 and an RF oscillator/transmitter 96 electrically connected with each other via interconnects 98. In addition to the foregoing components on the board 80, the device 76 may include the power source 110 in electrical communication with the electrical circuit 90 and antenna 102. The above-described electrical components 90, 92, 94 and 96, including the antenna 102 and/or power source 110, are formed on a board or substrate 80 in the form of a circuit board or an integrated chip. Alternatively, the power source 110 may be mounted off the substrate proximate a blade or vane, or both the antenna 102 and power source are off the board but remain in electrical communication with the telemetry transmitter circuit.

The embodiment shown in FIG. 6 and the embodiments shown in FIGS. 17-23, which are described in more detail below, may employ a resonant energy transfer assembly in which magnetic cores with windings are eliminated. These embodiments may be especially advantageous for use with smaller modular combustion turbine engines that are used in aeronautics. More specifically, such modular turbine systems for example incorporate a blisk that includes blades 301 integrally formed with a rotor disc 302 that are significantly smaller than for example compressor or turbine blade stages used in power generation plants. Accordingly, the blisk may not have sufficient surface area available for supporting the power induction coil assemblies 186 and 195 including the magnetic cores 190 and 200 shown in FIG. 14.

Moreover, in such modular turbine systems entire stages such as a compressor or turbine stage may be separated from an adjacent stage and replaced. Sensor routing wires are typically run through the rotor to slip rings or telemetry packs at one or both ends of the turbine rotor. In separating stages, the sensor routing wiring through the rotor must be cut and reconnected. This process results in expenditure of time and money, and the reconnected wires are much less reliable during operation of a turbine than the original routing wires. Use of distributed wireless telemetry systems, placed in each stage requiring sensors on rotating components, may eliminate the hard wiring that must be manually disconnected and reconnected when removing and replacing a compressor or turbine stage.

Figure 17:
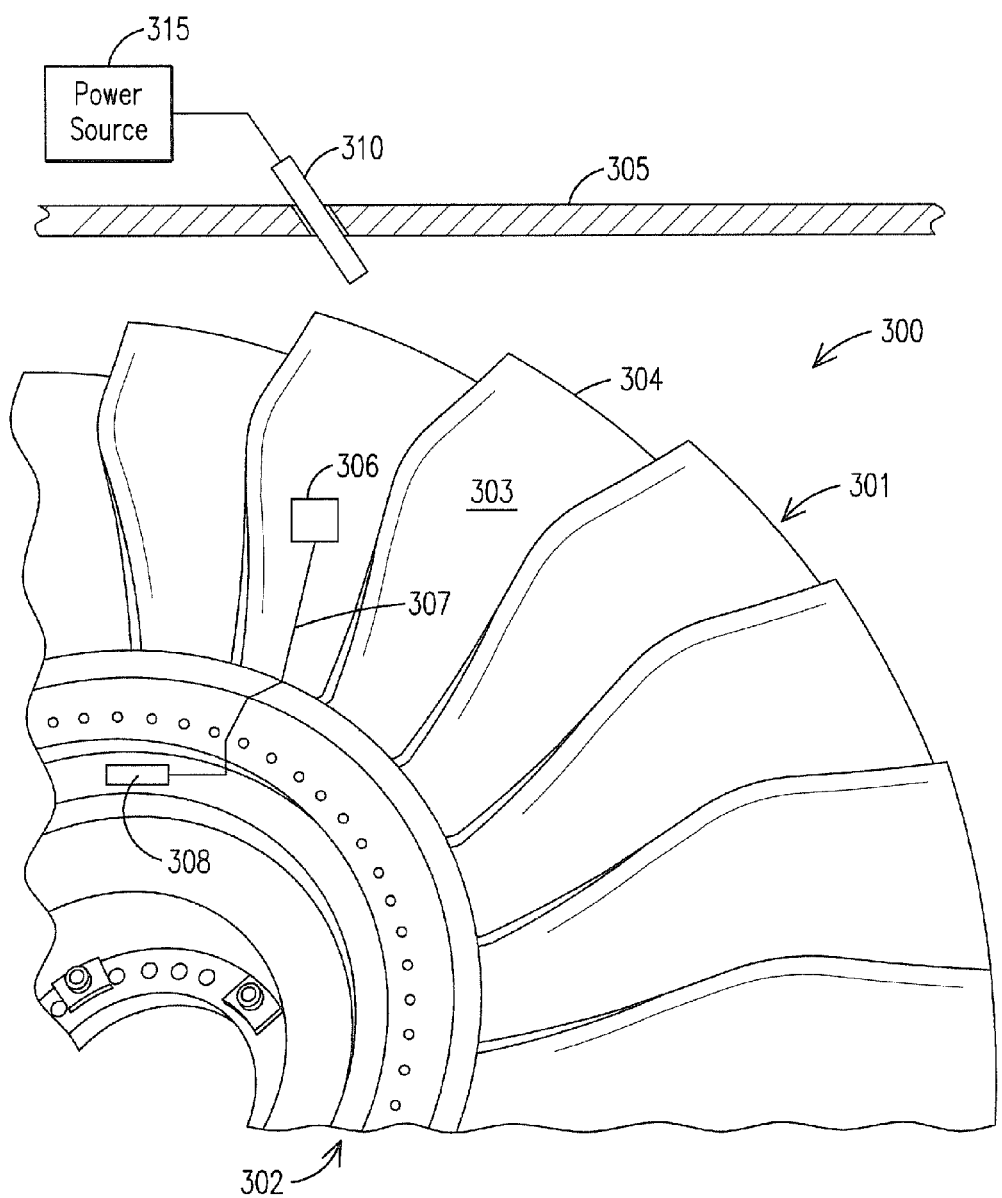
FIG. 17 is a partial perspective view of a blisk having thereon wireless telemetry components including a sensor and a telemetry device.

Components of the wireless telemetry system are shown in FIG. 17 with respect to a blisk 300 which includes a plurality of blades 301 integrally formed with a rotor disc 302. As shown, each blade 301 includes a foil portion 303 over which hot expanding gas flows causing the blisk 300 to rotate in the case of a turbine. In contrast, the rotation of a compressor blisk draws ambient temperature gas from outside the turbine past the rotating blades, compressing the gas as it is directed through the later compressor stages, and to the turbine stage of a turbine engine. Each blade 301 or foil portion 303 has a tip 304 adjacent and in spaced relation to a casing 305 within which rotating components such as the blades 301 and stationary components such as vanes (not shown) are positioned. The blisk 300 may be positioned for operation in a power turbine or compressor for a turbine engine. In addition, the below-described resonant energy transfer assembly may be used in connection with the monitoring of rotating components such as blades 301 or stationary components such as vanes.

An embedded or surface mounted sensor 306 is disposed on the blade 301 relative to an area for which operating conditions of the blade 301 are monitored. Temperature resistant lead lines or connectors 307 electrically link the sensor 306 with a wireless telemetry device 308. The device 308 is preferably mounted in a location where telemetry components are exposed to relatively lower temperatures such as the rotor 309 of the blisk 300 where the operating temperature is typically about 150° C. to about 250° C.

The sensor 306 and interconnect lines 307 may be deposited using known deposition processes such as plasma spraying, EB PVD, CVD, pulsed laser deposition, mini-plasma, direct-write, mini-HVOF or solution plasma spraying. Typically, dynamic pressure measurements, dynamic and static strain, and dynamic acceleration measurements are desired on both stationary and rotating components of combustion turbine 10 together with component surface temperature and heat flux measurements. Thus, embedded or surface mounted sensor 306 may be configured as strain gages, thermocouples, heat-flux sensors, pressure transducers, micro-accelerometers as well as other desired sensors. Moreover, the materials used to fabricate the sensor may include those thermocouple materials listed and described relative to the sensor 61 shown in FIG. 4 for both the compressor or turbine components.

Figure 18:
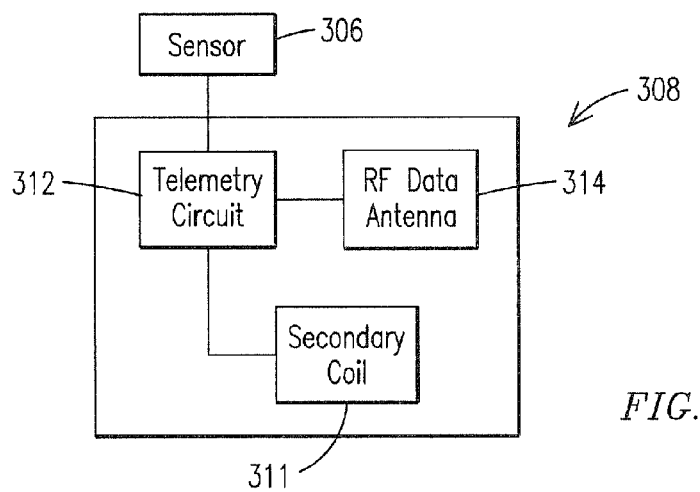
FIG. 18 is a schematic illustration of a telemetry device linked to a sensor.

The embodiment of the wireless telemetry system shown in FIGS. 17-25 includes a resonant energy transfer system having a primary coil or probe 310 mounted at a stationary location, within the compressor 12 or turbine 10, relative to the rotating components of assembly including wireless telemetry device 308 and sensor 306. By way of example, and as shown in FIG. 17, the primary coil 310 may be mounted to a casing 313 of the compressor or turbine and is linked to an RF power source 315. As shown in FIG. 18, the telemetry device 308 includes a telemetry circuit 312, such as that described relative to FIG. 15, and a power source in the form secondary coil 311. In addition, the transmitter device 308 includes RF data antenna 314 that is in electrical communication with the telemetry transmitter circuit 312.

The term "coil" as used herein in reference to the primary coil and the below-described secondary coil is not necessarily an indication of a physical configuration of such a component. Indeed, one or both of the "coils" may be in the form of a probe. The term "coil" is intended to include a power transmitting and power receiving device that include the appropriately configured electrical components such as capacitors and inductors to generate an oscillating current from the primary device and induces power in the secondary device which is tuned to resonate that the same frequency as that of the oscillating current.

In operation the primary coil 310, receiving power from the RF power source 315, generates an oscillating electromagnetic radiation signal field, and energy is transferred to the secondary coil 311 which powers the telemetry transmitter circuit 312. The sensor 306 generates electronic data signals, indicative of an operating condition of a component such as blades 301, and the electronic data signals are sent to the telemetry transmitter circuit 312, which routes the electronic data signals to the data antenna 314. The electronic data signals are indicative of an operating condition of the component, such as the blade 301. In an embodiment, the device 308 may be fabricated as a circuit board or as an integrated chip in which both the antenna 314 and the secondary coil 311 are deposited on a substrate with circuit 312.

Figure 19:
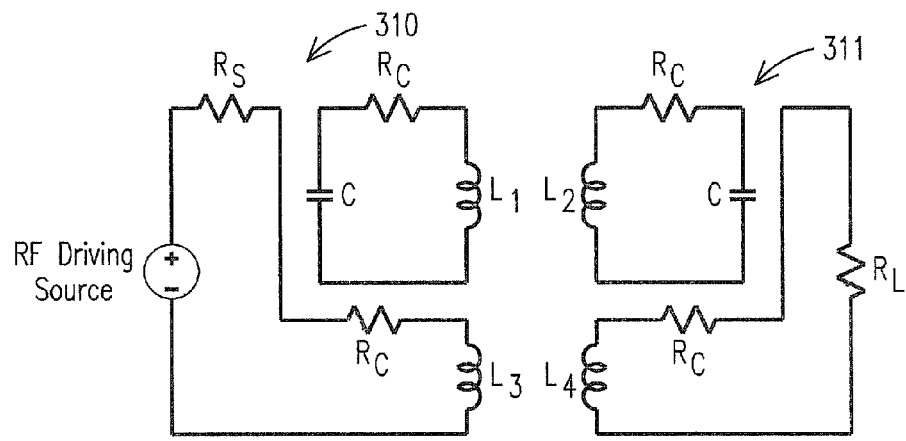
FIG. 19 is a schematic illustration of circuits for a resonant energy transfer system.

An exemplary circuit for the primary coils 310 and secondary coil 311 for the transfer of energy is shown in FIG. 19 and includes primary coil 310 includes a transmitting coil or inductor L1 linked to a source coil or inductor L3 via an air core transformer. Similarly, the secondary coil includes a receiving coil or inductor L2 linked to a source coil or inductor L4 via an air core transformer. The transmitting coil L1 has a resistance Rc and a resonating capacitor C; and, the receiving coil L2 also includes a coil resistance Rc and a resonating capacitor C. In this exemplary circuit, a source resistance Rs at the source coil L3 and the load resistance RL at the load coil L4 do not contribute to the Q of the resonant system, thereby increasing the coupling between the primary coil 310 and the secondary coil 311 and therefore the distance that power can be transmitted. The respective RLC circuits for the primary coil 310 and secondary coil 311 are tuned so that the coils 310 and 311 are resonant at the same or common frequency so that power may be transmitted from the primary coil 310 to the secondary coil 311.

The coils 310 and 311 may be composed of temperature and oxidative resistant materials such as Ni, a Ni-based superalloy, Incanel®, gold, platinum or other materials that are operative at temperatures of about 250° C. or higher. In addition an RF power driver may serve as the power source to the primary coil so that coils are resonant at a common frequency between the Hz and GHz range, with an exemplary embodiment being one MHz to about 15 MHz, and preferably at about 10 MHz.

Figure 20:
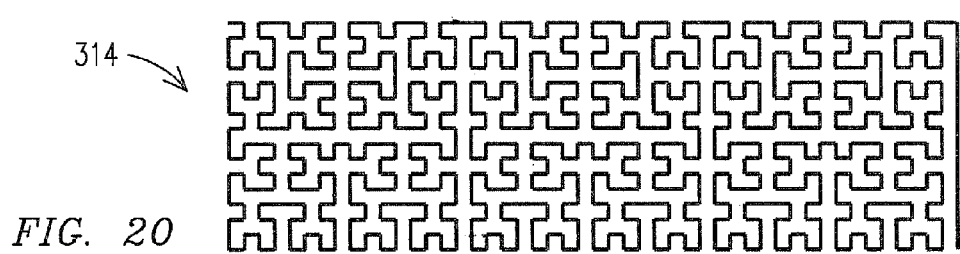
FIG. 20 is a schematic representation of a rotating data antenna.

As noted above, the antenna 314 is printed on the circuit board, and a desired length of the can be calculated as follows:

$$L = \frac{\lambda_D}{4\sqrt{(\varepsilon_r+1)/2}} = \frac{c/f}{4\sqrt{(\varepsilon_r+1)/2}}$$

wherein c is the speed of light in free space, f is the frequency of carrier signal and $\varepsilon_r$ is the dielectric constant of the substrate. For example in connection with a LTCC (low temperature co-fired ceramic) substrate the f=80 MHz and $\varepsilon_r$=6.7, an antenna length of 478 mm, which is far beyond an allowable size for a circuit board. Accordingly, an antenna trace may be provided in a folded back and forth configuration. A layout of an exemplary monopole antenna is shown in FIG. 20. In addition, the secondary coil 311 should be sufficiently separated from the telemetry circuit 312 except for a connecting signal path to avoid interference between the RF modulator and multivibrator circuit of the telemetry transmitter circuit 312.

Figure 22:
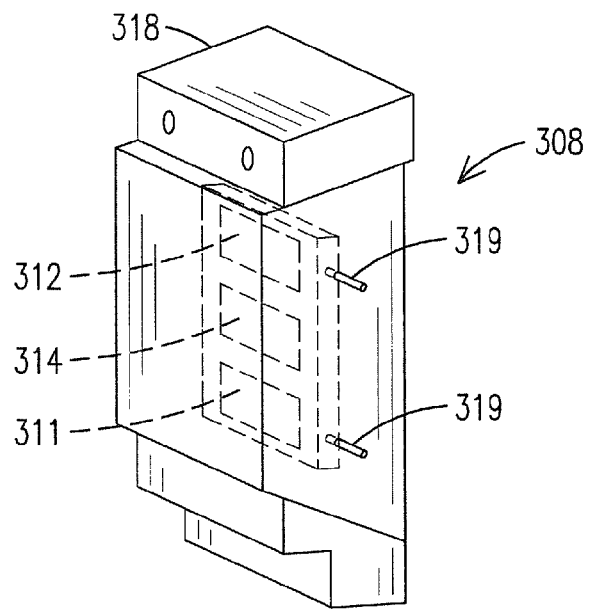
FIG. 22 illustrates a transmitter device housed within an RF transparent cover.
Figure 21:
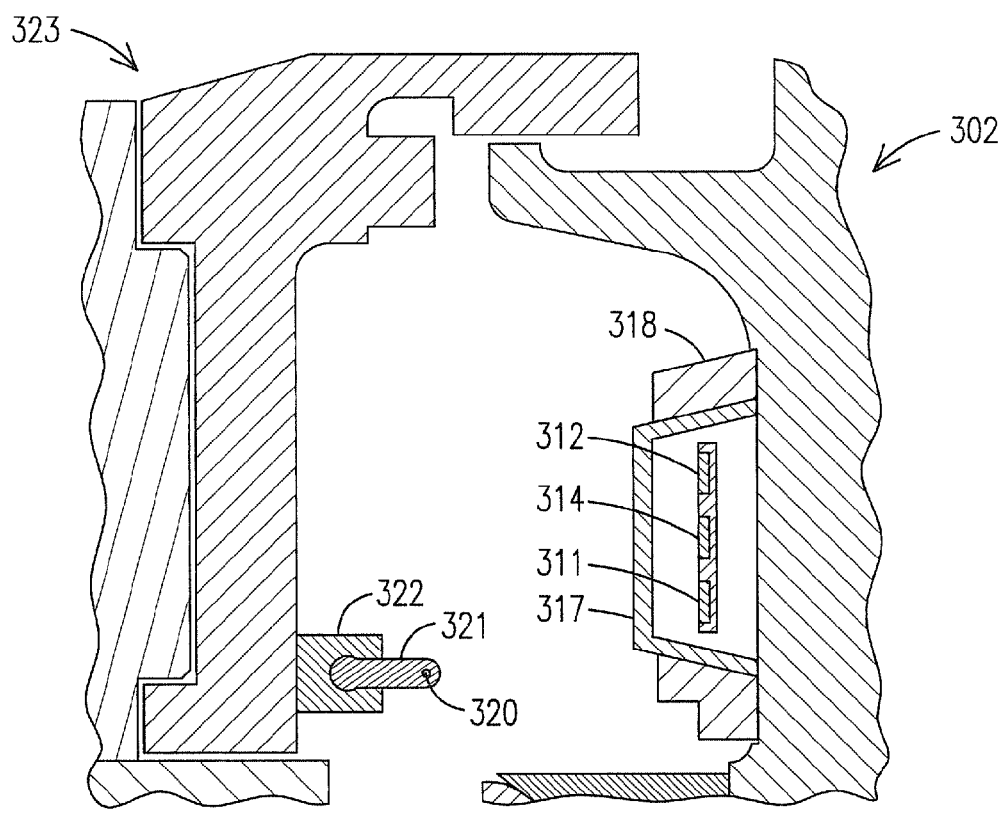
FIG. 21 is a sectional schematic illustration of a telemetry device on a rotor of a blisk including a rotating data antenna on the blisk and a stationary antenna on a stator.

FIG. 21 illustrates a sectional view of a blisk 300 and stator 323 with an embodiment of the invention having a telemetry transmitter assembly 316 contained within an RF transparent cover 317, which may be mounted proximate the rotor disc 302 of blisk 300 using bracket 318. As described above, the assembly 316 includes a telemetry circuit 312, secondary coil 311 and data antenna 314 fabricated in on the same substrate as an integrated chip. As seen in FIG. 22, connectors 319 are provided to electrically connect the lead lines 307 and sensor 306 to the telemetry transmitter circuit 312. In an embodiment, telemetry transmitter circuit 312, secondary coil 311 and antenna 314 may secured within the RF transparent cover 317 with a high temperature capable non-conducting, high dielectric potting material.

Again with respect to FIG. 21, the rotating data antenna 314 may be provided for communication with stationary data antenna 320, which is inserted into a non-conducting holder 321 for securing data transmission antenna 320 with bracket 322. The bracket 322 is mounted to a stationary component as the stator 323, or a static seal segment associated with the stator 323. Non-conducting holder 321 ensures that stationary data transmission antenna 320 does not contact bracket 322, which may be fabricated of metal, thereby ensuring correct operation. Non-conducting holder 322 may be fabricated from the same ZTA toughened ceramic or Yttria-stabilized zirconia (YSZ), alumina, or other high temperature ceramic material used for the RF transparent cover 317. In the case of employing the antenna 320 in an arcuate bracket, such as shown in FIG. 13, holder 322 may be segmented to provide flexibility, which allows for installation in a curved bracket. In an embodiment, the stationary antenna 320 may extend circumferentially on the stator 323 so that electronic data signals may be received from the rotating data antenna 314 at any point or time during operation of the turbine engine. As shown, an electrical lead wire 340 electrically connects the stationary antenna 320 to a controller or processor 341 so that the electronic data signal received from the rotating data 314 are transmitted for processing to monitor the operating conditions of the blade 301.

Figure 23:
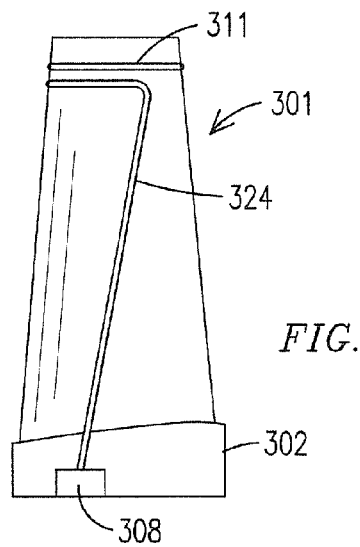
FIG. 23 is an embodiment of the wireless telemetry system wherein an energy receiving coil is on a blade for a blisk.

In yet another embodiment shown in FIG. 23, the secondary coil 311 may be deposited on the tip 304 of the foil portion 303 of blade 301. As shown, an electrical lead line 324 is also deposited on the blade 301 electrically connecting the coil 311 to the telemetry circuit 312 affixed to the rotor disc 302 in the manner described above. In such an embodiment, the rotating data antenna 314 may be fabricated on the circuit board 80 with the telemetry circuit 312, which eliminates the need for an antenna block in the area where the board 80 is located. This reduces the area required for locating the wireless telemetry system in the root section of a blade or blisk.

Figure 24:
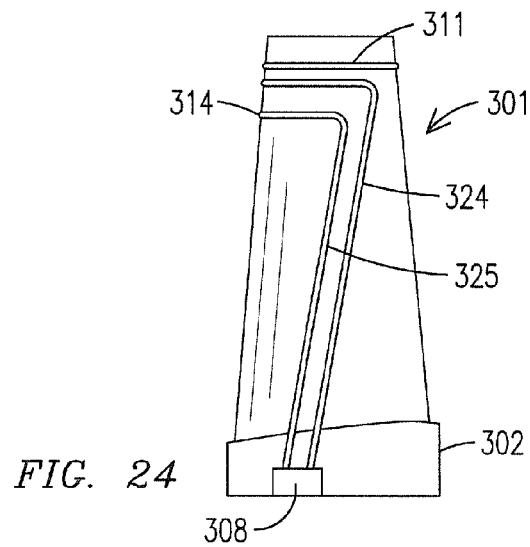
FIG. 24 is an embodiment of the wireless telemetry system wherein an energy receiving coil and the rotating data antenna are on a blade for a blisk.

In reference to FIG. 24, another embodiment of the invention both the secondary coil 311 and the rotating data antenna 314 are deposited on the foil portion 303 of the blade 301. As described above, the electrical lead line 324 electrically connects the coil 311 to the telemetry transmitter circuit 312 thereby powering the circuit 312. In addition, the electrical lead line 325 routes electrical data signals from the transmitter circuit 312 to the rotating data antenna 314. In such an embodiment, where the antenna 314 is on the blade 301 and not on the substrate of the telemetry circuit 312, an RF transparent cover is not required. The telemetry circuit 312 may be housed in an electronics package as shown in FIG. 11, and mounted to the rotor disc 302.

Figure 25:
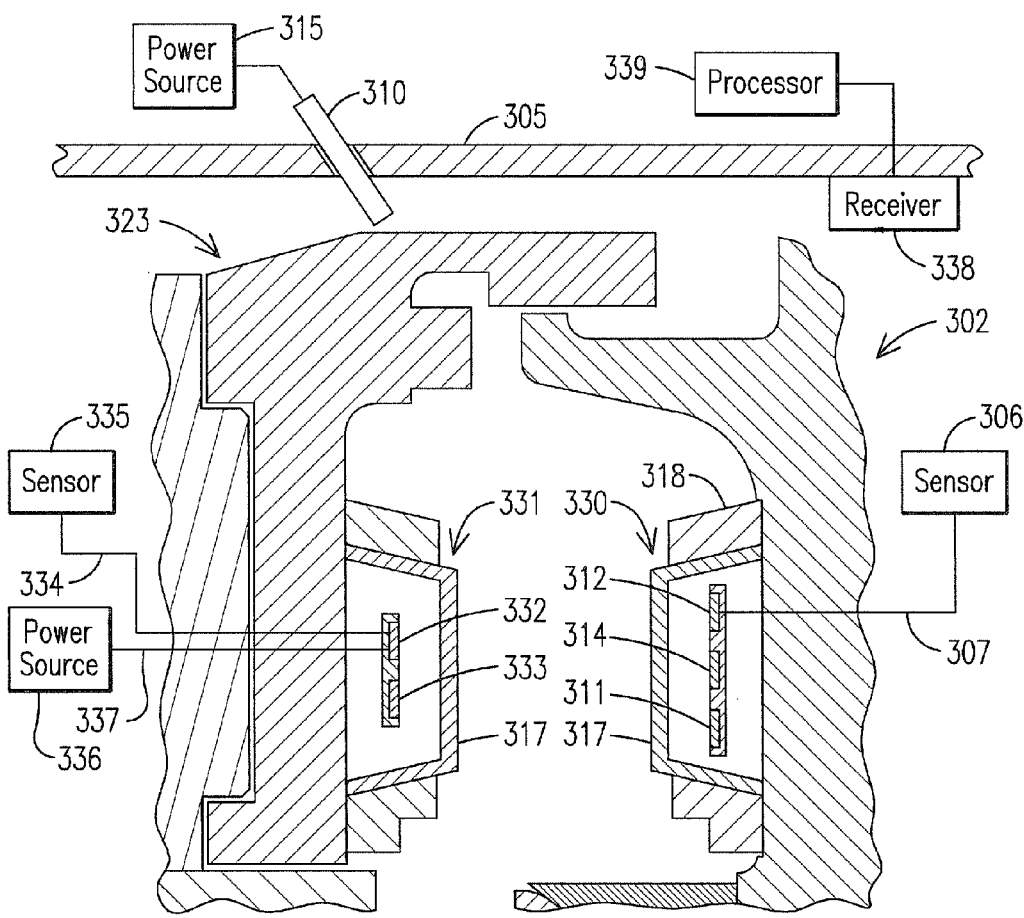
FIG. 25 is an embodiment of the wireless telemetry system wherein a stationary telemetry circuit and stationary antenna are used to transmit data relating to stationary components and rotating components.

With respect to FIG. 25, there is illustrated an embodiment of a wireless telemetry system including a resonant energy transfer system that includes two telemetry transmitter devices 330 and 331, each of which includes a telemetry transmitter circuit. More specifically, the system includes a first or rotating transmitter device 330 and a second or stationary transmitter device 331. FIG. 25 is a sectional view of a rotating component such as the above-described blisk 300 of a turbine or compressor, which may also represent a turbine blade stage of larger compressors and turbines. In addition, the blisk 300 is positioned adjacent a stationary component such as a stator 323.

As described above, the first (or rotating) telemetry device 330 may include a telemetry transmitter circuit 312, a data antenna 314 and a secondary coil 311 fabricated as an integrated chip. Alternatively, either one or both of the data antenna 314 and/or secondary coil 311 are on the blade 301 or airfoil 303. In addition, one or more sensors 306 are disposed on a portion of the blade 301 that is intended to be monitored during operation of the compressor 12 or turbine 10. Electrical lead lines 307 connect the sensors 306 to the telemetry transmitter circuit 312 in order to route electric data signals, indicative of an operating condition of the blade 306, to the telemetry transmitter circuit 312. The transmitter circuit 312 is electrically connected to the first antenna 314 to route the electric data signals to the antenna 314.

As shown, the telemetry system includes a primary coil 310 that is linked to an RF power source 315, supplies a current or power to the primary coil 310. The primary coil 310 is positioned at a stationary location relative to blisk 300, such as a turbine or compressor casing 305. As described above the primary coil 310, receiving power from the RF power source 315, generates an oscillating electromagnetic radiation signal field, and energy is transferred to the secondary coil 311 which powers the telemetry transmitter circuit 312.

Assuming that the antenna 314 is fabricated on the same substrate as the telemetry circuit 312, the telemetry device 330 includes an RF transparent cover 314 and bracket 318 to affix the circuit 312 to the rotor disc 302 of the blisk 300. An RF transparent cover is not required if the antenna 314 is disposed on the blade 301 or some other location on the blisk 300 and off the substrate of the telemetry transmitter circuit 312.

In the embodiment shown in FIG. 25, the wireless telemetry system also includes a mechanism for acquiring and transmitting electronic data signals indicative of a condition of a stationary component within the turbine 10 or compressor 12. Accordingly, a second or stationary telemetry device 331 is affixed to the stator 323. Similar to the first telemetry device 330, the second telemetry device 331 includes a telemetry circuit 332 and antenna 333 (also referred to as a stationary antenna or second antenna), that are fabricated on a substrate in the form of an integrated chip; however, the antenna 333 may be affixed to the stator apart from telemetry circuit 333 as shown in FIG. 22.

As further shown in FIG. 25, one or more sensors 335 are positioned at stationary locations in the compressor 12 or turbine 10, to monitor conditions of the stator 323 or other stationary components. Electrical lead lines 334 electrically connect the sensors 335 to the second or stationary telemetry circuit 332 to transmit electronic data signals indicative of the condition of a stationary component to the second telemetry circuit 332. The telemetry circuit 332 is in electrical communication with the second or stationary antenna 333 to route the signals to the antenna 333. The stationary antenna 333 may be fabricated on the same substrate as that of the telemetry circuit 332, or may be separately mounted as shown in FIG. 21. Moreover, the RF transparent cover 317 is not required for the second telemetry circuit 332 or antenna, as operating conditions such as windage and centrifugal loading may not be as extreme relative to the blade 301 and disc 302.

In a preferred embodiment a power source 336 is linked to the second telemetry circuit 332 via an electrical lead line 337. This electrical connection may be necessary in order to provide sufficient power to the telemetry circuit 332 to route signals from the sensors 335 to the antenna 333 and further transmit the electronic data signals from the second or stationary antenna 333 to a receiver 338. As shown, the receiver 338 is mounted at a stationary location proximate the second antenna 333 and is linked to a controller or processor 339 for processing the electronic signals that are indicative of operating conditions of stationary and rotating components. The antenna 333 is configured to transmit electronic data signals received from the stationary sensors 335 and telemetry circuit 332 as well as electronic data signals transmitted from the rotating antenna 314. The electronic data signals may be transmitted from the stationary antenna 333 either wirelessly or via an electronic lead wire (not shown). In this manner, the stationary antenna 333 receives and transmits electronic data signals relative operating conditions of both stationary and rotating components of a turbine 10 or compressor 12.

An embodiment of the telemetry system shown in FIGS. 26-31, comprises an induction power system that includes a primary induction coil assembly 400 mounted on a static seal segment of a stator 323 and a secondary induction coil assembly 402 mounted to the turbine blade 406. Each assembly 400, 402 includes an induction coil that is formed as a planar winding 410, 420 on a ceramic substrate or printed wire board 404. For example, the windings 410, 420 may be formed on a low temperature co-fired ceramic (LTCC) or high temperature co-fired ceramic (HTCC) printed wire board. Conductive material such as gold, silver, platinum and/or alloys thereof may be used to form the windings. In particular low-temperature co-fired ceramic tape such as 951 Green Tape manufactured by Dupont may be used to form the windings 410, 420. The use of such metals and/or metal alloys in conjunction with the LTCC board provides primary and secondary coils that reliably operate at temperatures up to approximately 1500° C. and the LTCC typically has a dielectric and insulation strength of over 1,000 volts, which enables generation of more power than conventional induction coils.

Figure 26:
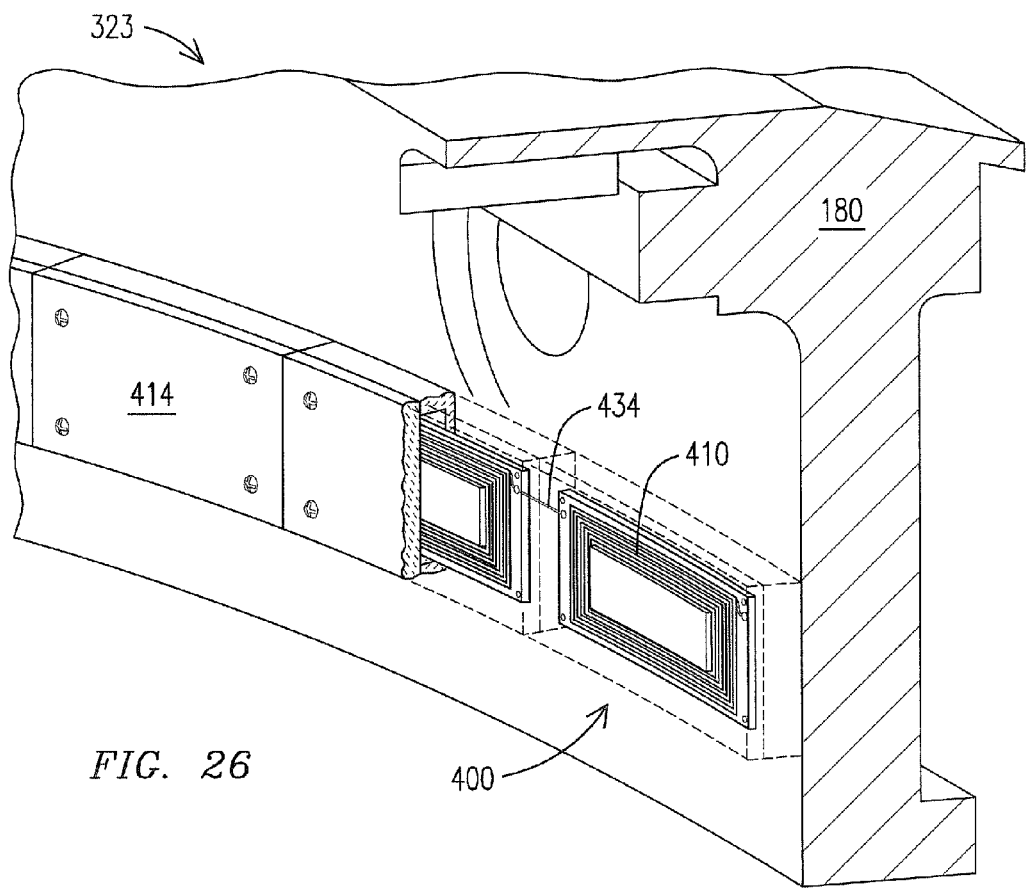
FIG. 26 is a perspective view of primary induction assemblies mounted to a static seal segment of a stator.
Figure 27:
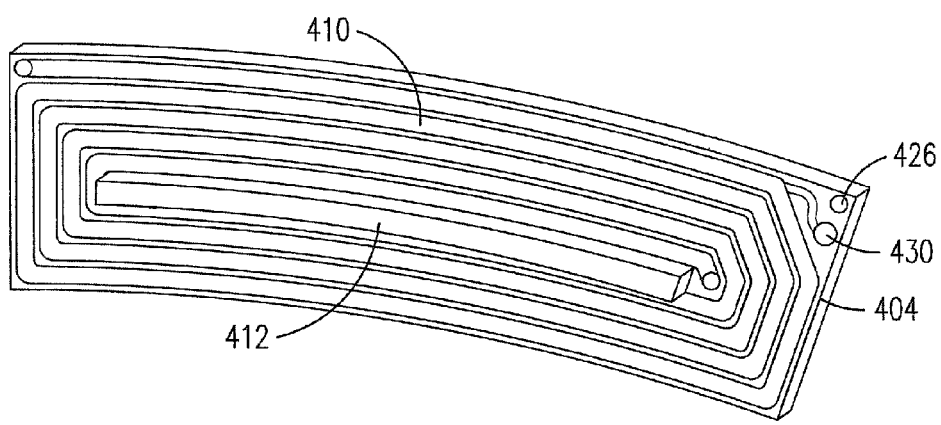
FIG. 27 is a perspective view of a schematic representation of a planar winding and magnetic core on a ceramic substrate.
Figure 28:
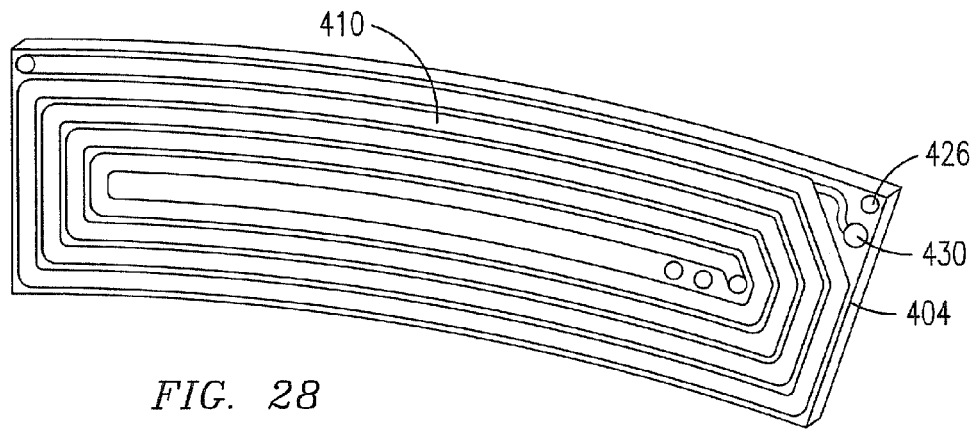
FIG. 28 is a perspective view of a schematic representation of a planar winding without a magnetic core on a ceramic substrate.
Figure 31:
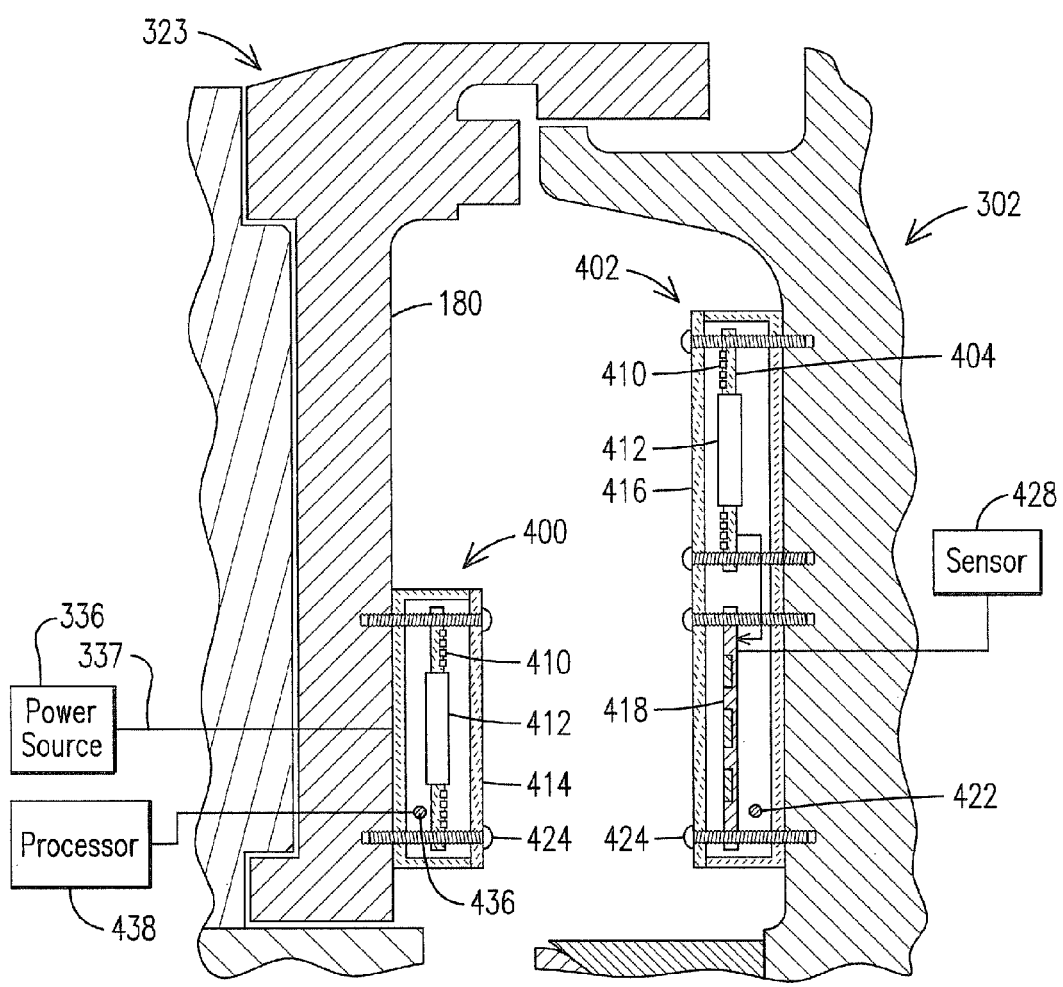
FIG. 31 is an embodiment of the wireless telemetry system incorporating primary and secondary induction power assemblies that include planar windings formed on ceramic boards.

In addition, as shown in FIGS. 26 and 27, a magnetic core 412, preferably fabricated from ferromagnetic or ferrimagnetic material such as iron or ferrite, may be mounted or bonded to the board to enhance or increase inductance. A centrally positioned slot may be formed in the board 404 and the magnetic core 412 is inserted in the slot and affixed to the board using known potting materials and techniques. Alternatively, a magnetic core is not required as shown in FIG. 28. The magnetic core 412 may be used to increase the inductance of the respective assemblies 400, 402.

Again with respect to FIG. 26, a plurality of primary induction coils assemblies 400 are aligned end to end and affixed to the static seal segment 180 of the stator 323. As used herein, induction coil assembly is intended to include a single assembly or a plurality of the assemblies aligned end to end as illustrated. In an embodiment of the invention, a plurality of the primary induction coil assemblies 400 are aligned end to end on the stator 323, and preferably span the entire circumference of the static seal segment of the stator 323. As shown, the boards 404 are disposed within casings 414 preferably fabricated from a ceramic matrix composite such as Nextel 720 which is manufactured by COI Ceramics, Inc. located in San Diego, Calif. The casings 414 can be bolted to the static seal segment, and the boards 404 preferably have apertures 426 through which bolts 424 are inserted for alignment of the boards 404 within the casings 414.

Although the induction coil assemblies 400 and 402 are shown as including a single board or substrate, in an embodiment the assemblies 400, 402 may include a plurality of ceramic dielectric layers and a plurality of conductive layers each including a planar winding formed on a top and bottom sides or surfaces of the substrate. In additional, internal conductive layers are formed between consecutive ceramic dielectric layers. The planar winding of each conductive layer is electrically connected to the next adjacent or consecutive planar winding through holes or vias so the windings are connected from the top to bottom surfaces to form an integrated coil for an inductor.

Figure 29:
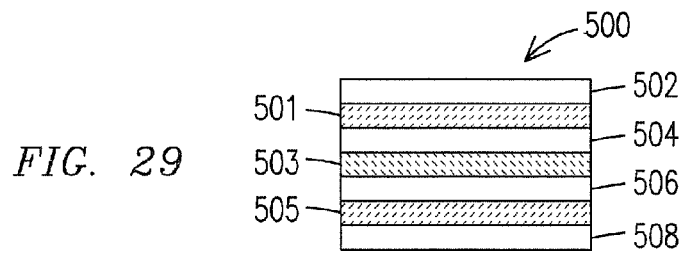
FIG. 29 is a schematic cross-sectional view of circuit board with a plurality of ceramic dielectric layers and planar windings formed thereon.

A schematic representation of such a multilayered board 500 is shown in FIG. 29. As shown, the board 500 includes three ceramic dielectric layers 501, 503 and 505 and four conductive layers 502, 504, 506 and 508, each conductive layer representing a planar winding that together form the integrated planar winding or coil 410 or 412, depending whether the board 500 is a component of the primary inductive coil assembly 400 or secondary inductive coil assembly 402. As mentioned above, each conductive layer or winding is electrically connected to a consecutive adjacent layer through conductively filled or lined vias or holes (not shown) formed in an intermediate dielectric layer 501, 503 and 505. The board 500 is connected to a power source at the top conductive layer 502 so that an electrical current flows from the planar winding on the top conductive layer 502 to the planar winding forming the second conductive layer 504, then to the planar windings forming the third and fourth conductive layers 506, 508.

While the embodiment shown in FIG. 29 and in FIGS. 30A-30D includes four conductive layers, alternative embodiments may contain more or fewer conductive layers. Indeed, for such multi-layered configurations, the board 500 may contain as few as two conductive layers or as many as thirty or more conductive layers. In a preferred embodiment, the board 500 includes an even number of conductive layers and an odd number of dielectric layers, so that the board 500 has a planar winding on a top surface and bottom surface of the board 500.

Figure 30A:
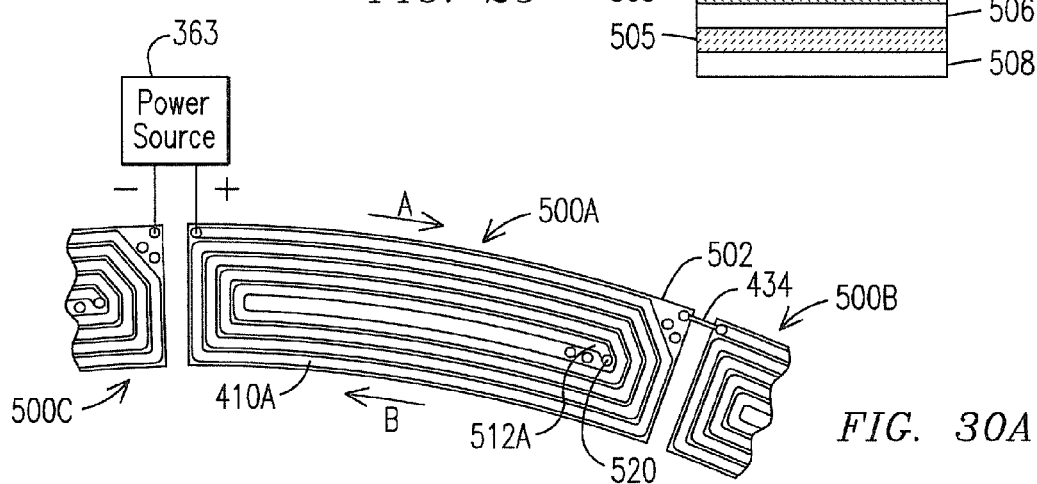
FIG. 30A is an elevational view of the top or first conductive layer of the circuit board of FIG. 29.

Configurations of the planar windings 410A-410D on each of the conductive layers 502, 504, 506 and 508 are shown in FIGS. 30A-30D. The planar windings 410A-410D are shown in FIG. 30A in connection with primary induction power assemblies 400. Accordingly in FIG. 30A, the top or first conductive layer 502 of a first board 500A is shown connected in series with an adjacent second board 500n via wire 434, and so on through a last board 500C. The winding 410A is connected to power source 336 for an electrical input. In addition, the winding 410A of the top conductive layer 502 of the last board 500C is connected to the negative terminal of the power source 336 to complete a circuit including the plurality of induction power assemblies 400 connected in series.

As further illustrated in FIG. 30A, the planar winding 410A of the top or first conductive layer 502 has a generally spiral configuration and is connected to a power source 336 so that an electrical current input into the planar winding 410 at an outermost end 510A of the winding 410A. Therefore, electrical current flows in a clockwise direction, as represented by arrows A and B, from the outermost end 510A of the winding 410A to an innermost end 512A of the winding 410A. The inner most end 512A of the winding 410A is in turn connected to the innermost end 512B of the planar winding 410B for the second conductive layer 504, which is shown in FIG. 30B, by one or more vias 520.

Figure 30B:
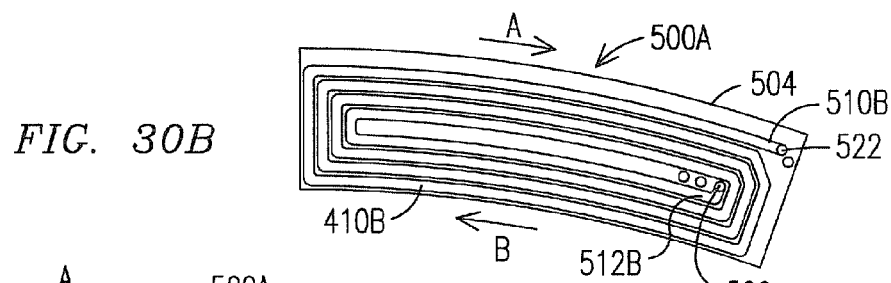
FIG. 30B is an elevational view of a second conductive layer of the circuit board of FIG. 29.

With respect to FIG. 30B, the planar winding 410B of the second conductive layer 504 is shown as also having a generally spiral configuration so that the electrical current flowing from the planar winding 410A flows from the innermost end 512B in a clockwise direction to the outermost end 510B of the winding 410B. The outermost end 510B of winding 410B of the second conductive layer 504 is electrically connected to an outermost end 510 C of the planar winding 410C of the third conductive layer 506, which is shown in FIG. 30C, by via 522.

Figure 30C:
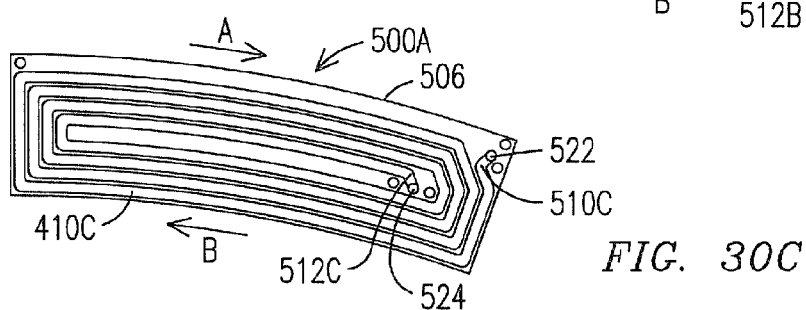
FIG. 30C is an elevational view of a third conductive layer of the circuit board of FIG. 29.

With respect to FIG. 30C, the planar winding 410C of the third conductive layer 506 is shown as also having a generally spiral configuration so that the electrical current flowing from the planar winding 410B flows from the outermost end 510C in a clockwise direction to the innermost end 512C of the winding 410C. The innermost end 512C of winding 410C of the third conductive layer 506 is in turn electrically connected to an innermost end 512D of the planar winding 410D of the fourth conductive layer 506 by via 524.

Figure 30D:
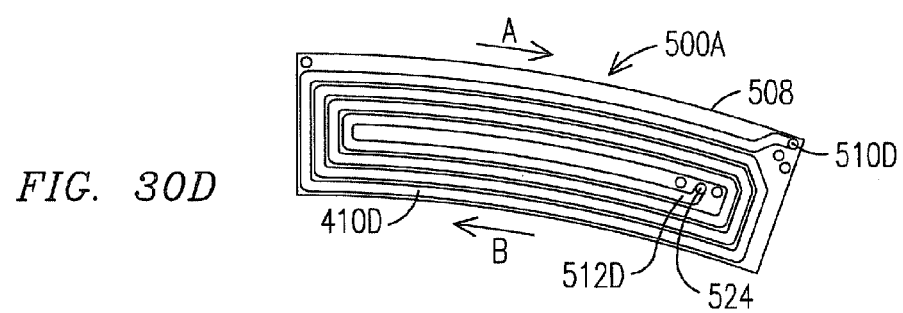
FIG. 30D is an elevational view of a bottom or fourth conductive layer of the circuit board of FIG. 29.

With respect to FIG. 30D, the planar winding 410D of the fourth conductive layer 506 also has a generally spiral configuration with the electric current flowing in a clockwise direction as represented by arrows A and B. In a preferred embodiment of the induction power system, each of the primary induction coil assemblies 400 includes the above described integrated coil and winding. By providing an integrated induction coil or winding the magnetic field and amount of power generated or transferred by each assembly 400 and winding 410 is increased.

The above described induction coil assemblies may include a magnetic core. More specifically, each spiral shaped planar winding includes a central area 530 within the winding 410. In addition the area 530 of each dielectric may be aligned and a slot is formed in each such dielectric layer and in which a magnetic core is fixed.

The telemetry system is shown in FIG. 29 and includes the primary induction coil assembly 400 mounted to the static seal segment of a stator 323, and a secondary induction coil assembly 402 mounted to the end face of a root for a turbine blade 301 or to rotor disc 302. As described above, a plurality of the primary induction coil assemblies 400 are aligned end to end on the stator 323, and preferably span the entire circumference of the static seal segment of the stator 323. Accordingly, the boards or substrates 404 may be generally arc shaped. In addition, as shown in FIGS. 27 and 28, an electrical pad 430 is formed on each board and electrically connected to winding the winding 410. In this manner, and as seen in FIG. 26, a 434 wire may be soldered or brazed to electrical pads 430 of adjacent assemblies 400 so the planar windings 410 are connected in series.

In the embodiment shown in FIG. 29, the secondary induction coil assembly 402 also includes a casing 416 within which the ceramic substrate 404 and winding 420 is mounted. As shown, a telemetry circuit 418 and antenna 422 may be disposed within the casing 416. Similar to the induction windings 410, the telemetry circuit 418 and antenna 422 may be formed on an LTCC substrate, which may be the same substrate as that on which the winding 420 is formed or a separate substrate. Alternatively, the telemetry circuit 418 and rotating data antenna 422 may be in a separate casing adjacent to the secondary induction coil assembly. In either case, the telemetry circuit 418 is connected to winding 412 and antenna 422. In addition, while the embodiment of the telemetry system shown in FIGS. 26 and 29 have the casings 414 mounted directly to the stator; however the casings may be mounted to the stator 323 using other mechanisms such as the brackets shown in FIGS. 12 and 22.

The primary induction coil assembly 400 is placed in electrical communication with the power source 337 via an electrical lead line 337. The primary coil 400, receives power from the power source 336, generates an oscillating magnetic field, and energy is transferred to the secondary coil 402 which powers the telemetry transmitter circuit 418. A sensor 428 mounted to the turbine blade 301, for example to the airfoil of the blade, is provided in electrical communication with the telemetry circuit 418 and detects an operating parameter associated with the rotating component and generates electronic data signals indicative of a condition of the turbine blade 302. These electronic data signals are transmitted to the antenna 422 via the telemetry transmitter circuit 418. The sensor 418 may include any of the previously described sensors and can be affixed to the turbine blade 301 at locations and using techniques as previously described, including the deposition techniques in forming the sensors and electrical connects to the telemetry circuit.

A stationary data antenna 436 is mounted to an area in or on the turbine 10 or compressor 12 in proximity to the rotating data antenna 422 for receiving the electronic data signals from the rotating data antenna 422. As shown in FIG. 29, the antenna 436 may be mounted within the casing 414 of the primary induction coil assembly and may simply include a wire fixed in the casing 414. Alternatively, the antenna 436 may be formed on the ceramic substrate 404 on which the primary winding 410 is formed or a separate substrate. In yet another embodiment, the antenna 436 may be in a separate casing altogether; however, in any embodiment, the antenna 436 must be positioned on the turbine 10 or compressor 12 and relative to the rotating antenna 422 so the electronic data signals will be received.

In a preferred embodiment, multiple stationary antennas 436 may be used, and mounted on the static seal segment of the stator 323 at multiple locations such as within each casing 414 of the primary induction coil assemblies 400. With multiple stationary antennas 436 positioned around the circumference of static seal segment of the stator 323 a stationary antenna 436 will be available for receipt of electronic signals despite the location of the rotating data antenna 422 as the rotor rotates during operation of the turbine 10 or compressor. To that end, the stationary antenna 436 is placed in electrical communication with a processor 438 for processing the electronic data signals that are indicative of a condition of the turbine component, e.g. turbine blade.

Moreover, the arrangement of the multiple primary induction coil assemblies 400 provides for coupling of power between the primary and secondary coil assemblies, 400 and 402, regardless of the position of the rotating secondary coil assembly. In a preferred embodiment, the primary induction coil assemblies span 360° about the static seal segment 180 of the stator 323. Embodiments of the present invention may employ a high frequency to drive the stationary primary windings 410, such as frequencies from about 0.25 MHz to about 2 MHz with a power driver designed to operate at such frequencies.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

The invention claimed is:

1. A telemetry system for use in a combustion turbine engine having a compressor, a combustor and a turbine, the telemetry system comprising:
  a sensor on a turbine blade;
  a telemetry transmitter circuit affixed to the turbine blade;
  a first electrical connection on the turbine blade for routing electronic data signals from the sensor to the telemetry transmitter circuit, the electronic data signals indicative of a condition of the turbine blade;
  an induction power system for powering the telemetry transmitter circuit comprising:
  at least one stationary primary induction coil assembly affixed to a stationary component adjacent to the turbine blade; and,
  a rotating secondary induction coil assembly mounted to an end face of a root of the turbine blade;
  wherein the stationary primary induction coil assembly comprises a plurality of ceramic substrates, including a first and last ceramic substrate, mounted to a static seal segment of the stationary component and the ceramic substrates are aligned end to end forming a continuous arc spanning a circumference of the static seal segment wherein on each ceramic substrate a planar winding is formed and the planar windings are electrically connected in series to adjacent planar windings on adjacent ceramic substrates, and an external power source is electrically connected to the planar winding of the first ceramic substrate and to the planar winding of the last ceramic substrate in the series;
  a rotating data antenna affixed to the end face of the root of the turbine blade;
  a second electrical connection on the turbine blade for routing the electronic data signals from the telemetry transmitter circuit to the rotating data antenna; and,
  a stationary data antenna affixed to the stationary component.

2. The telemetry system of claim 1, wherein the rotating secondary induction coil comprises at least one ceramic substrate mounted to an end face of the turbine blade root and on the ceramic substrate a planar winding is formed and the planar winding is electrically connected to the telemetry transmitter circuit.

3. The telemetry system of claim 1, wherein each ceramic substrate is composed of a low temperature co-fired ceramic.

4. The telemetry system of claim 1, wherein each ceramic substrate is composed of a high temperature co-fired ceramic.

5. The telemetry system of claim 1, wherein the stationary primary induction coil assembly includes a plurality of RF transparent casings that are composed of a composite ceramic matrix and each ceramic substrate is disposed within a respective casing and each casing is affixed to the static seal segment.

6. The telemetry system of claim 1, wherein the rotating secondary induction coil assembly includes a ceramic substrate with a planar winding encased in an RF transparent casing that is composed of a composite ceramic matrix, and the casing is affixed to the end face of the turbine blade root.

7. The telemetry system of claim 1, wherein each ceramic substrate includes at least one slot centrally disposed within the respective planar winding and within which a magnetic core is disposed.

8. A telemetry system for use in a combustion turbine engine having a compressor, a combustor and a turbine, the telemetry system comprising:
  a sensor on a component of the combustion turbine engine wherein the component operates at temperatures of at least about 450° C.;
  a telemetry transmitter circuit, in electrical communication with the sensor, wherein electronic data signals indicative of a condition of the component are routed from the sensor to the telemetry transmitter circuit;
  an induction power system for powering the telemetry transmitter circuit comprising:
  at least one primary induction coil assembly including a first ceramic substrate on which
  a first planar conductive winding is formed and is electrically connected to a power source, wherein the first ceramic substrate is mounted to the turbine in spaced relation to the component with the winding facing the component and the first ceramic substrate provides insulating properties at temperatures up to about 1500° C.; and,
  a secondary induction coil assembly mounted to the component in spaced relation to the primary induction coil assembly and including at least one second ceramic substrate on which a second planar conductive winding is formed that is electrically connected to the telemetry transmitter circuit and the second ceramic substrate provides insulating properties at temperatures up to about 1500° C.;
  a first data antenna affixed to the component and electrically connected to the telemetry transmitter circuit for receiving the electronic data signals from the sensor via the telemetry transmitter circuit; and,
  a second data antenna affixed to the turbine in spaced relation to the first data antenna for receiving electronic data signals transmitted from the first data antenna.

9. The telemetry system of claim 8, further comprising an electrically conductive material deposited on the component for routing electronic signals from the sensor to the telemetry transmitter circuit.

10. The telemetry system of claim 8, wherein the at least one primary induction coil assembly is energized at between approximately 0.25 and 2.00 MHz so that the secondary induction coil assembly has an operating frequency of between 0.25 and 2.00 MHz and provides power to the telemetry transmitter circuit.

11. The telemetry system of claim 8, wherein there is a plurality of the primary induction coil assemblies mounted to a static seal segment of the component and aligned end to end spanning a circumference of the static seal segment and all the planar windings are electrically connected in series.

* * * * *